(12) United States Patent
Yamasaki et al.

(10) Patent No.: US 8,240,422 B2
(45) Date of Patent: Aug. 14, 2012

(54) STEER-BY-WIRE TYPE STEERING DEVICE

(75) Inventors: Tatsuya Yamasaki, Iwata (JP); Yoshinori Itakura, Iwata (JP); Nobuyuki Suzuki, Iwata (JP)

(73) Assignee: NTN Corporation, Osaka (JP)

(*) Notice: Subject to any disclaimer, the term of this patent is extended or adjusted under 35 U.S.C. 154(b) by 0 days.

(21) Appl. No.: 13/338,911

(22) Filed: Dec. 28, 2011

(65) Prior Publication Data
US 2012/0097470 A1    Apr. 26, 2012

Related U.S. Application Data

(63) Continuation of application No. PCT/JP2010/060809, filed on Jun. 25, 2010.

(30) Foreign Application Priority Data

Jul. 2, 2009    (JP) .................... 2009-157417
Jul. 2, 2009    (JP) .................... 2009-157422

(51) Int. Cl.
*B62D 5/00*    (2006.01)

(52) U.S. Cl. ............ 180/402; 180/405; 180/407

(58) Field of Classification Search .......... 180/402, 180/405, 407
See application file for complete search history.

(56) References Cited

U.S. PATENT DOCUMENTS

| | | | |
|---|---|---|---|
| 7,878,512 B2 * | 2/2011 | Horiuchi et al. | 280/5.522 |
| 2004/0026158 A1 | 2/2004 | Rieth et al. | |
| 2008/0201037 A1 * | 8/2008 | Suyama et al. | 701/36 |
| 2008/0203690 A1 * | 8/2008 | Horiuchi et al. | 280/86.75 |
| 2010/0191405 A1 * | 7/2010 | Sugitani et al. | 701/29 |

FOREIGN PATENT DOCUMENTS

| | | |
|---|---|---|
| JP | 2003-118597 | 4/2003 |
| JP | 2003-529483 | 10/2003 |
| JP | 2005-138709 | 6/2005 |
| JP | 2005-263182 | 9/2005 |
| JP | 2005-349845 | 12/2005 |
| JP | 2007-290507 | 11/2007 |
| JP | 2009-101858 | 5/2009 |
| WO | WO 01/72571 A2 | 10/2001 |

OTHER PUBLICATIONS

International Search Report for PCT/JP2010/060809 mailed Aug. 17, 2010.
International Preliminary Report on Patentability mailed Feb. 23, 2012 issued in corresponding International Patent Application No. PCT/JP2010/060809.

* cited by examiner

*Primary Examiner* — Lesley D. Morris
*Assistant Examiner* — Michael Stabley

(57) ABSTRACT

A steer-by-wire steering system includes a steering motor, a steering power transmitting mechanism for transmitting a rotation of the steering motor to a steering axle, a toe angle adjusting motor and a toe angle adjusting power transmitting mechanism for adjusting the toe angle upon rotation of the toe angle adjusting motor. A switching mechanism is provided which operates in such a manner that in the event of failure of the steering motor, the rotation of the toe angle adjusting motor in place of the steering motor is transmitted to the steering power transmitting mechanism to enable a wheel turning, but in the event of failure of the toe angle adjusting motor, the wheel turning is carried out only by the steering motor. A hollow motor is employed for one or both of the steering motor and the toe angle adjusting motor.

29 Claims, 11 Drawing Sheets

Fig. 9
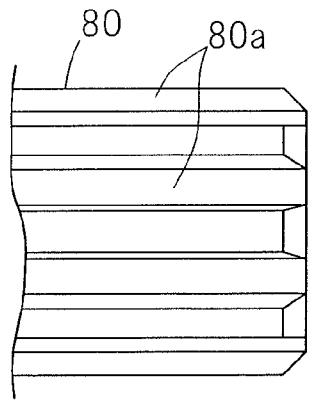
PRIOR ART
Fig. 10A         Fig. 10B
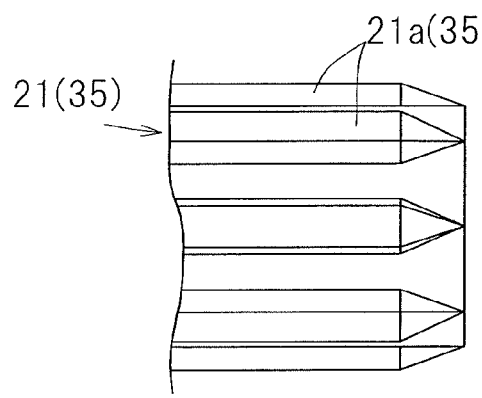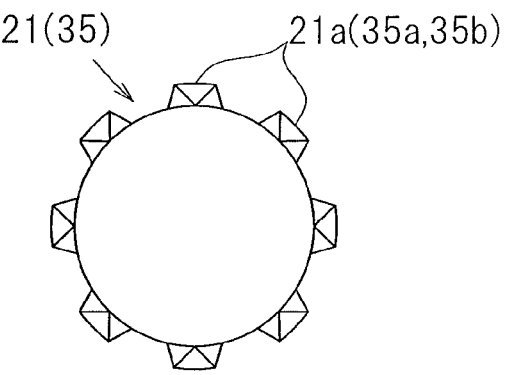
Fig. 11A         Fig. 11B
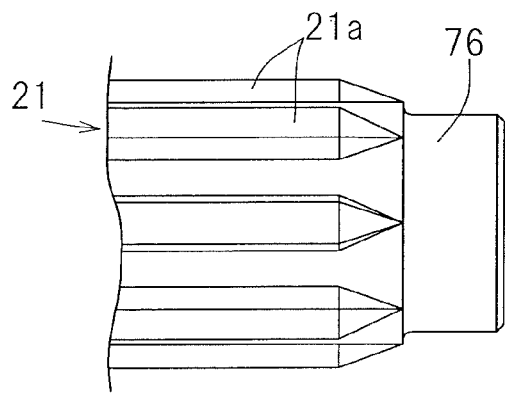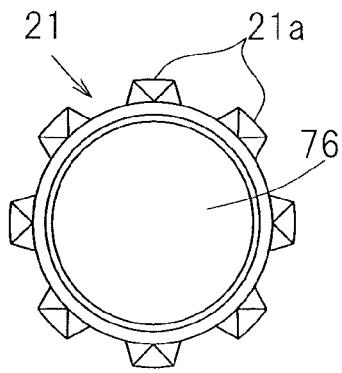

STEER-BY-WIRE TYPE STEERING DEVICE

CROSS REFERENCE TO THE RELATED APPLICATION

This application is a continuation application, under 35 U.S.C §111(a) of international application No. PCT/JP2010/060809, filed Jun. 25, 2010, which claims priority to Japanese patent applications No. 2009-157417 and No. 2009-157422, both filed Jul. 2, 2009, the entire disclosures of both which are herein incorporated by reference as a part of this application.

BACKGROUND OF THE INVENTION

1. Field of the Invention

The present invention relates to a steer-by-wire steering system for performing the steering of an automotive vehicle with a steering wheel that is not mechanically connected with the steering axle for steering purpose.

2. Description of Related Art

The steer-by-wire steering system of the kind referred to above has been known, which makes use of an auxiliary motor for turning a vehicle to be steered, in the event of failure of a steering motor for steering the wheel to be steered. In this respect, see the patent document 1 listed below.

In the steer-by-wire steering system for independently steering left and right wheels of either the front wheel system or the rear wheel system, suggestion has been made to control the left and right wheels so as to assume a toe-in or toe-out condition in the event of occurrence of an abnormality, to thereby secure a braking force. In this respect, see the patent document 2 listed below.

PRIOR ART LITERATURE

[Patent Document 1] JP Laid-open Patent Publication No. 2005-349845
[Patent Document 2] JP Laid-open Patent Publication No. 2005-263182

According to the patent document 1 listed above, the disclosed steer-by-wire steering system makes use of a fail-safe functionality, in which the auxiliary motor is activated in the event of failure of the steering motor. It has, however, been found that unless the steering motor fails, the auxiliary motor does not operate in anyway whatsoever and, therefore, the use of the auxiliary motor appears uneconomical.

On the other hand, according to the patent document 2 listed above, while the system is used to independently steer the left and right wheels, the wheels will become uncontrollable in the event of occurrence of an abnormality and, therefore, a problem has been found that no action can be taken to avert the risk by allowing the wheels to be properly steered.

SUMMARY OF THE INVENTION

In view of the foregoing, the present invention has for its essential object to provide a structurally compact steer-by-wire steering system, which has a failsafe functionality to allow a toe angle adjusting motor to be diverted to a drive source for wheel steering in the event of failure of the steering motor.

Another important object of the present invention is to provide the steer-by-wire steering system of the kind referred to above, in which, even in the event of failure of the toe angle adjusting motor, a toe angle adjusting mechanism is frozen to allow a system mounted vehicle to run in securely and in which the required switching to be performed in the event of failure of either of the steering motor and the toe angle adjusting motor can be performed accurately.

In order to accomplish the foregoing objects, the present invention provides a steer-by-wire steering system comprising a steering wheel mechanically isolated from a steering axle, a steering angle sensor for detecting a steering angle of the steering wheel, a steering motor, a steering power transmitting mechanism for transmitting a rotation of the steering motor to the steering axle, a toe angle adjusting motor, a toe angle adjusting power transmitting mechanism for adjusting a toe angle by means of a rotation of the toe angle adjusting motor, and a steering control section for generating a command signal of a wheel-turning angle and a command signal of the toe angle on the basis of the steering angle detected by the steering angle sensor and applying those command signals to the steering motor and the toe angle adjusting motor; in which there is provided a switching mechanism operable in the event of failure of the steering motor to disconnect the steering motor from the steering power transmitting mechanism and to transmit the rotation of the toe angle adjusting motor in place of the steering motor to the steering power transmitting mechanism, while restraining the toe angle from changing, to enable a vehicle wheel to turn and, also, operable in the event of failure of the toe angle adjusting motor to disable the toe angle adjusting power transmitting mechanism from transmitting a motion and to enable only a vehicle wheel turning by the steering motor; and in which one or both of the steering motor and the toe angle adjusting motor is or are employed in the form of a hollow motor.

According to the above described construction, by the switching mechanism, in the event of failure of the steering motor, the steering motor is disconnected from the steering power transmitting mechanism and, while a change of the toe angle is inhibited, the rotation of the toe angle adjusting motor in place of the steering motor is transmitted to the steering power transmitting mechanism to enable the wheel turning, thus providing a failsafe functionality by which wheel turning can be effected even in the event of failure of the steering motor. Also, by the switching mechanism, in the event of failure of the toe angle adjusting motor, the toe angle adjusting power transmitting mechanism is held in a condition unable to transmit the motion to enable the steering motor to perform the wheel turning, and, accordingly, a safe driving can be accomplished with the toe angle adjusting mechanism frozen in the event of failure of the toe angle adjusting motor. When one or both of the steering motor and the toe angle adjusting motor is/are employed in the form of the hollow motor, various component parts of the steer-by-wire steering system can be snugly and neatly arranged in a limited available space and the entire structure can be assembled compact. It is to be noted that the hollow motor is intended to mean any electrically operated motor having a tubular hollow motor shaft.

In the present invention, the steering axle may be a shaft which, when moved in an axial direction, turns a vehicle wheel, but which, when rotated, changes the toe angle of the vehicle wheel, in which case the steering power transmitting mechanism is operable to axially move the steering axle by means of the rotation of the steering motor; the toe angle adjusting power transmitting mechanism is operable to rotate the steering axle by means of the rotation of the toe angle adjusting motor; and the switching mechanism is operable in the event of failure of the steering motor to disconnect the steering motor from the steering power transmitting mechanism and to transmit the rotation of the toe angle adjusting motor in place of the steering motor to the steering power transmitting mechanism, while restraining the steering axle from rotating, to thereby enable the vehicle wheel to turn and, also, operable in the event of failure of the toe angle adjusting motor to disable the steering axle from rotating and to enable only a vehicle wheel turning by the steering motor.

If so constructed as described above, the steering axle can be axially moved by the rotation of the steering motor through the steering power transmitting mechanism to accomplish the wheel turning favorably and, also, the steering axle can be rotated by the rotation of the toe angle adjusting motor through the toe angle adjusting power transmitting mechanism to accomplish the toe angle adjustment. In addition, by the switching mechanism, in the event of failure of the steering motor and in the event of failure of the toe angle adjusting motor, the power transmission system can be favorably switched between the steering power transmitting mechanism and the toe angle adjusting power transmitting mechanism.

In the present invention, the toe angle adjusting motor referred to above may be employed in the form of a hollow motor, in which case the steering axle is inserted through the hollow motor shaft of the toe angle adjusting motor comprised of the hollow motor. Also, the steering motor may be employed in the form of a hollow motor, in which case a component part of the switching mechanism is inserted through the hollow motor shaft of the steering motor comprised of the hollow motor.

If so constructed as hereinabove described, both of the toe angle adjusting motor and the steering motor and both of the steering axle and the component parts of the switching mechanism can be arranged snugly and neatly.

In the present invention, a portion of the steering axle may be provided with a ball screw shaft portion in which the use may be made of a ball nut threadingly engaged with the ball screw shaft portion for rotation only, in which case the steering power transmitting mechanism is operable to axially move the steering axle by rotating the ball nut by means of the rotation of the steering motor, to thereby perform the wheel turning. According to this construction described above, since a operating site of the steering power transmitting mechanism may be at least comprised of only the ball nut, the structure of the steering power transmitting mechanism can be simplified.

In the present invention, the steering axle may be rotatably provided with a spline shaft portion, in which case the use is made of a spline nut engageable with the spline shaft portion for axial relative movement; the toe angle adjusting power transmitting mechanism is operable to rotate the spline nut by means of the toe angle adjusting motor to rotate the steering axle while permitting the axial movement of the steering axle, to thereby change the length of projection of a tie rod, engaged with a toe angle adjusting male threaded portion at one end of the steering axle, from the steering axle so as to change the toe angle. According to the construction described above, since the operating site of the toe angle adjusting power transmitting mechanism can be at least comprised of only the spline nut, the structure of the toe angle adjusting power transmitting mechanism can be simplified.

Where the above described construction is employed, the spline teeth of the spline shaft portion of the steering axle and the spline teeth of the spline nut may be brought in either a sliding contact with each other or a rolling contact with each other. Whichever the contact take place, a force can be favorably transmitted from the spline nut to the spline shaft portion.

Also, a pair of toe angle adjusting male threaded portions provided in opposite ends of the steering angle may have respective helices opposite to each other so that when the spline nut is rotated in a predetermined certain direction, the left and right tie rods can be caused to protrude, but when rotated in the reverse direction, the left and right tie rods are retracted. According to the construction described above, when only one spline nut is rotated, the left and right tie rods can be axially advanced or retracted relative to the steering axle.

Also, the use may be made of a housing for accommodating the steering power transmitting mechanism and having the steering axle extending therethrough, in which case the housing is provided with a tubular housing portion that is situated on an outer peripheral side of the nut portion of each of the tie rods threadingly engaged with the respective toe angle adjusting male threaded portion of the steering axle; the tubular housing portion is projected from an inner end of the nut portion in a direction axially outwardly thereof; a sectional outer peripheral surface of a part or the whole of an outer periphery of the housing portion, lying perpendicular to a longitudinal axis of the nut portion is, of a shape different from a circle about the longitudinal axis; the use is made of a stationary slide bearing having an inner peripheral shape matching with the outer peripheral shape of the nut portion, the stationary slide bearing being provided as fixed to an inner periphery of the tubular housing portion, the nut portion being supported by the stationary slide bearing for sliding movement in the axial direction, but non-rotation.

If so constructed as hereinabove described, since the nut portion of each of the tie rods is axially slidably supported by the stationary slide bearing, when the steering axle is to be axially moved and when the steering axle is rotated to change the length of projection of the tie rod from the steering axle is to be changed, the tie rod can be stably axially moved. Also, since the stationary slide bearing supports the nut portion non-rotatably, the rotation of the steering axle can be assuredly translated into an axial movement of the tie rod.

Furthermore, the use may be made of an annular movable slide bearing slidable along an inner peripheral surface of the tubular housing portion, the movable slide bearing being provided as fixed to an axial portion of the outer peripheral surface of the nut portion of each of the tie rods. The use of the movable slide bearing is effective to stabilize the axial movement of the tie rod.

Where both of the stationary slide bearing and the movable slide bearing are employed, the distance between respective mutually confronting end faces of the stationary and movable slide bearings, when the steering axle is held at an intermediate position, which is a position within an axial motion range of the steering axle, at which an automotive vehicle is in position to travel straight forwards, may be equal to or greater than the length of the axial motion range. By so choosing the dimensional relation discussed above, even when the steering axle moves to the end of the axial motion range, the stationary slide bearing and the movable slide bearing do not interfere with each other.

In the present invention, the toe angle adjusting motor may be of a type in which the maximum generated torque is smaller than the maximum generated torque of the steering motor. Since alternate use of the toe angle adjusting motor as the steering drive source in the event of failure of the steering motor and the use for the toe angle adjustment during a normal operation are made during the travel of the automotive vehicle, the maximum generated torque thereof is far lower than the torque required by the steering motor during a stationary steering. Accordingly, the toe angle adjusting motor may be sufficient if it be smaller than the steering motor.

In the present invention, the steering axle may be operable to turn the vehicle wheel upon axial movement thereof and to change the toe angle of the vehicle wheel as a result of the rotation thereof, in which case the switching mechanism is provided with a linear motion actuator for axially movably arranging a steering intermediate shaft, provided in the steering power transmitting mechanism, for transmitting the rotation of the steering motor, and a toe angle adjusting intermediate shaft, which is provided in the toe angle adjusting power transmitting mechanism for transmitting the rotation of the toe angle adjusting motor, in a fashion coaxial with each other and also for axially moving those intermediate shafts together; and the switching mechanism includes the transmission coupling and decoupling mechanism operable in the event of failure of the steering motor to cause the linear motion actuator to axially move both of the intermediate shafts so as to perform a series of such operations that after the toe angle adjusting intermediate shaft has been disengaged from the toe angle adjusting motor, the steering intermediate shaft is disengaged from the steering motor to connect it with the toe angle adjusting motor so as to enable the steering to be performed by the toe angle adjusting motor and the rotation of the toe angle adjusting power transmitting mechanism is fixed.

According to the construction described above, the series of operations to switch the power transmission system between the steering power transmitting mechanism and the toe angle adjusting power transmitting mechanism in the event of failure of the steering motor and of the toe angle adjusting motor are carried out by the transmission coupling and decoupling mechanism by axially moving the steering intermediate shaft and the toe angle adjusting intermediate shaft by means of the linear motion actuator. In particular, when the steering intermediate shaft and the toe angle adjusting intermediate shaft are coaxially and axially movably arranged relative to each other and those two intermediate shafts are driven by the linear motion actuator so as to move together in the axial direction, the switching mechanism can be assembled compact since the series of operations referred to above is carried out by the transmission coupling and decoupling mechanism.

In the present invention, the switching mechanism may be so configured that by causing the linear motion actuator to move both of the intermediate shafts in the axial direction, in the course of disengaging the steering intermediate shaft from the steering motor and then connecting the steering intermediate shaft with the toe angle adjusting motor after the toe angle adjusting intermediate shaft has been disengaged from the toe angle adjusting motor, a condition occurs in which, without the steering intermediate shaft being disengaged from the steering motor, only the toe angle adjusting intermediate shaft is disengaged from the toe angle adjusting motor and, when in the event of failure of the toe angle adjusting motor the amount of movement of the linear motion actuator is adjusted, the toe angle adjusting motor and the toe angle adjusting power transmitting mechanism can be disengaged from each other without the steering motor and the steering power transmitting mechanism being disengaged from each other.

According to the construction described above, after the two intermediate shafts have been moved in the axial direction by the linear motion actuator and the toe angle adjusting intermediate shaft has subsequently been disconnected from the toe angle adjusting motor, in the course of connecting the steering intermediate shaft with the toe angle adjusting motor after the steering intermediate shaft has been disconnected from the steering motor, the condition possibly may occur in which, without the steering intermediate shaft being disconnected from the steering motor, only the toe angle adjusting intermediate shaft is disconnected from the toe angle adjusting motor and, therefore, by adjusting the amount of movement of the linear motion actuator, in the event of failure of the toe angle adjusting motor, disconnection between the toe angle adjusting motor and the toe angle adjusting power transmitting mechanism can be performed without the steering motor and the steering power transmitting mechanism being disconnected from each other.

In the present invention, both of the intermediate shafts may be switched in position by the linear motion actuator to one of the reference position and the position in the axial direction at the time of failure of the steering motor, in which case the switching mechanism includes a steering rotatable member, which is positioned on an outer periphery of the steering intermediate shaft and is adapted to be rotated by the steering motor, and a toe angle adjusting drive member, positioned on an outer periphery of the toe angle adjusting intermediate shaft and adapted to be rotated by the toe angle adjusting motor, and a toe angle adjusting driven member positioned on an outer periphery of the toe angle adjusting intermediate shaft for transmitting the rotation of the toe angle adjusting intermediate shaft towards a downstream side; and in which case the transmission coupling and decoupling mechanism includes a first transmission coupling and decoupling mechanism operable to connect the steering intermediate shaft with the steering rotatable member when both of the intermediate shafts are held at the reference position, but to disconnect the steering intermediate shaft from the steering rotatable member and, on the other hand, to connect the steering intermediate shaft with the toe angle adjusting drive member when held at the position at the time of failure of the steering motor, a second transmission coupling and decoupling member operable to connect the toe angle adjusting intermediate shaft with the toe angle adjusting drive member when both of the intermediate shafts are held at the reference position, but to disconnect the connection between the toe angle adjusting intermediate shaft and the toe angle adjusting drive member when held at the position at the time of failure of the steering motor, and a third transmission coupling and decoupling mechanism operable to connect the toe angle adjusting intermediate shaft with the toe angle adjusting driven member and also to render the toe angle adjusting intermediate shaft in a non-connected relation with a housing for supporting the steering axle when both of the intermediate shafts are held at the reference position, but to connect the toe angle adjusting intermediate shaft with the housing when held at the position at the time of failure of the steering motor.

If the transmission coupling and decoupling mechanism is of the structure including the first to third transmission coupling and decoupling mechanisms, in the event of failure of the steering motor and the toe angle adjusting motor, a series of operation to switch the power transmission system between the steering power transmitting mechanism and the toe angle adjusting power transmitting mechanism can be performed assuredly.

More specifically, both of the intermediate shafts may be switched in position by the linear motion actuator to one of the reference position, the position at the time of failure of the steering motor and a position at the time of failure of the toe angle adjusting motor, which is a position intermediate between the reference position and the position at the time of failure of the steering motor, in which case, when both of the intermediate shafts are held at the position at the time of failure of the toe angle adjusting motor, the first transmission coupling and decoupling mechanism is in position not to disconnect the connection with the steering rotatable member, the second transmission coupling and decoupling mechanism is in position to disconnect the connection with the toe angle adjusting drive member, and the third transmission coupling and decoupling mechanism is in position to connect it with the housing. If so constructed as described above, the switching of the power transmission system between the steering power transmitting mechanism and the toe angle adjusting power transmitting mechanism in the event of failure of the toe angle adjusting motor becomes assured.

The steering motor is preferably employed in the form of the hollow motor having a hollow motor shaft, in which case the hollow motor shaft is used as the steering rotatable member with the steering intermediate shaft inserted through the hollow motor shaft. If so constructed as described above, the steering motor, the steering rotatable member and the steering intermediate shaft can be arranged smugly and neatly.

In the present invention, the linear motion actuator may include a spring member for biasing both of the intermediate shafts in the axial direction, and a spring coupling and decoupling mechanism capable of switching the spring member to one of a non-biasing condition, in which the spring member is retained in a compressed condition to disable the biasing to the intermediate shafts, and a biasing condition in which retention of the compressed condition is released to enable the biasing by the spring member. If the linear motion actuator is comprised of the spring member and the spring coupling and decoupling mechanism, the use of a power source for the linear motion actuator can be eliminated.

In the case of the above described construction, the spring coupling and decoupling mechanism may, include an obstructing element arranged within a linear motion range of the spring member or within a motion range of a member capable of undergoing a linear motion together with the spring member for obstructing the linear motion, and an obstructing element removing mechanism for removing the obstructing element to release the spring member from the compressed condition. If the spring coupling and decoupling mechanism is comprised of the obstructing element and the obstructing element removing mechanism as described above, the spring coupling and decoupling mechanism can have a simplified structure.

The obstructing element removing mechanism may be of a type capable of removing, by means of the linear motion actuator, the obstructing element protruding within the linear motion range of the spring member or within the motion range of the member capable of undergoing the linear motion together with the spring member. If so constructed as described above, the obstructing element removing mechanism can have a simplified structure.

Also, the spring coupling and decoupling mechanism include a linear to rotary motion translating mechanism for translating the linear motion of the spring member into a rotary motion, and a rotation regulating mechanism for regulating the rotation of the linear to rotary motion translating mechanism. Even where the spring coupling and decoupling mechanism is comprised of the linear to rotary motion translating mechanism and the rotation regulating mechanism, the spring coupling and decoupling mechanism can have a simplified structure.

Also, the rotation regulating mechanism may include a projecting piece provided in a rotary shaft, a lever playing a role of halting the rotation by engaging with the projecting piece and a linear motion actuator for activating the lever. If the rotation regulating mechanism is comprised of the projecting piece, the lever and the linear motion actuator, the rotary motion of the linear to rotary motion translating mechanism can be regulated assuredly.

Where the transmission coupling and decoupling mechanism includes the first to third transmission coupling and decoupling mechanism, in the transmission coupling and decoupling mechanism, coupling and decoupling a power transmission between the steering motion transmitting mechanism and the toe angle adjusting power transmitting mechanism and both of the intermediate shafts are preferably accomplished by means of splines of internal teeth and splines of external teeth, which are capable of being meshed with each other. According to the splines of the internal teeth and the splines of the external teeth, which are engageable with each other, coupling and decoupling of the power transmission between both of the steering power transmitting mechanism and the toe angle adjusting power transmitting mechanism and both of the intermediate shafts can be performed easily.

In the case of the above described construction, more specifically, the steering rotatable member, the toe angle adjusting drive member and spline forming portions of the housing are arranged in a direction conforming to the direction of arrangement of the steering intermediate shaft and the toe angle adjusting intermediate shaft; the first transmission coupling and decoupling mechanism may include splines of internal teeth formed in an inner periphery of the steering rotatable member, splines of internal teeth formed in an inner periphery of the toe angle adjusting drive member, and splines of external teeth provided in an outer periphery of the steering intermediate shaft and capable of engaging the splines of the internal teeth of the steering rotatable member, when the steering intermediate shaft is held at the reference position, but capable of disengaging from the splines of the internal teeth of the steering rotatable member and engaging the splines of the internal teeth of the toe angle adjusting drive member when the steering intermediate shaft is held at the position at the time of failure of the steering motor; the second transmission coupling and decoupling mechanism comprises the splines of the internal teeth of the toe angle adjusting drive member and the splines of the external teeth provided in the outer periphery of the toe angle adjusting intermediate shaft and capable of engaging the splines of the internal teeth of the toe angle adjusting drive member when at the reference position, but disengaging from the splines of the internal teeth of the toe angle adjusting drive member when held at the position at the time of failure of the steering motor; and the third transmission coupling and decoupling mechanism comprises splines of internal teeth provided in an inner periphery of a toe angle adjusting driven member, splines of internal teeth provided in the housing and splines of external teeth provided in an outer periphery of the toe angle adjusting intermediate shaft and capable of engaging the splines of the internal teeth of the toe angle adjusting driven member when at the reference position, but capable of engaging both of the splines of the internal teeth of the toe angle adjusting driven member and the splines of the internal teeth of the housing when held at the position at the time of failure of the steering motor.

The shape of an axial tip end on a coupling and decoupling side of spline teeth forming the splines may be a tapering shape in which the angle delimited between opposite side faces represents an acute angle.

Also, the sectional shape of spline teeth forming the splines may represent a trapezoidal shape except for an axial tip end on a coupling and decoupling side thereof, in which case the sectional shape of an axial tip end of the spline teeth on the coupling and decoupling side represents a triangular shape. In either case, coupling and decoupling for the power transmission between the steering power transmitting mechanism and the toe angle adjusting power transmitting mechanism can be performed smoothly.

Where the transmission coupling and decoupling mechanism includes the splines of the internal teeth and the splines of the external teeth, which are engageable with each other, the use may be made of a failure handling control section for activating the switching mechanism in response to detection of failure of the steering motor and failure of the toe angle adjusting motor, and of a correcting operation control section operable, when the third transmission coupling and decoupling mechanism of the switching mechanism is to be activated in response to the detection of the failure of the steering motor, to cause the toe angle adjusting motor to rotate the toe angle adjusting intermediate shaft an angular distance equal to or larger than one pitch of the neighboring spline teeth of the toe angle adjusting intermediate shaft meshed with the spline teeth of the housing while urging the toe angle adjusting intermediate shaft in the axial direction.

If so constructed as hereinabove described, in the event of failure of the steering motor and the toe angle adjusting motor, the switching mechanism can be properly actuated by the failure handling control section. Also, in the event of failure of the steering motor, if by the correcting operation control section, the toe angle adjusting intermediate shaft is rotated the angular distance equal to or larger than one pitch of the neighboring spline teeth of the toe angle adjusting intermediate shaft meshed with the spline teeth of the housing while the toe angle adjusting intermediate shaft is axially urged, respective phases of the spline teeth of the housing and the spline teeth of the toe angle adjusting intermediate shaft can be aligned with each other. When such correcting operation is caused to occur, fixture of the toe angle adjusting intermediate shaft to the housing can be accomplished smoothly with no error in operation.

Also, the third transmission coupling and decoupling mechanism is preferably so designed as to result in fixture of the rotation of the toe angle adjusting intermediate shaft prior to disconnection the toe angle adjusting intermediate shaft from the toe angle adjusting motor in the course of the axial movement of both of the intermediate shafts from the reference position towards the position at the time of failure of the steering motor. If prior to disconnection of the toe angle adjusting intermediate shaft from the toe angle adjusting motor, the rotation of the toe angle adjusting intermediate shaft is frozen, the operation to fix the toe angle adjusting power transmitting mechanism takes place after the operation to switch the drive source for wheel turning from the steering motor over to the toe angle adjusting motor has been completed. For this reason, those operations can be performed accurately with no error in operation.

Furthermore, a tip end of the steering intermediate shaft on a side confronting the toe angle adjusting intermediate shaft is preferably provided with a projection formed by protruding that tip end towards an axial end side beyond the spline teeth of the steering intermediate shaft engageable with the spline teeth of the toe angle adjusting drive member at the time of failure of the steering motor, the projection having an outer diameter equal to or smaller than a teeth bottom radius of the spline teeth of the steering intermediate shaft.

When the steering intermediate shaft and the toe angle adjusting intermediate shaft are held at the reference position, the spline teeth of the toe angle adjusting intermediate shaft and the spline teeth of the toe angle adjusting drive member are meshed with each other and, hence, the toe angle adjusting motor and the toe angle adjusting intermediate shaft are drivingly coupled with each other. In the event that the steering intermediate shaft and the toe angle adjusting intermediate shaft are held at the position at the time of failure of the steering motor, the spline teeth of the toe angle adjusting intermediate shaft and the spline teeth of the toe angle adjusting drive member are disengaged from each other and the spline teeth of the steering intermediate shaft are newly meshed with the spline teeth of the toe angle adjusting drive member and, hence, the toe angle adjusting motor and the steering intermediate shaft are drivingly connected with each other. If the tip end of the steering intermediate shaft on one side confronting the toe angle adjusting intermediate shaft is provided with the projecting piece, when the steering intermediate shaft and the toe angle adjusting intermediate shaft are switched in position from the reference position to the position at the time of failure of the steering motor, the spline teeth of the toe angle adjusting intermediate shaft are first disengaged from the spline teeth of the toe angle adjusting drive member by a distance equal to the axial distance of the projection and, subsequently, the spline teeth of the steering intermediate shaft are mesh with the spline teeth of the toe angle adjusting drive member. In other words, after the driving connection between the toe angle adjusting motor and the toe angle adjusting intermediate shaft has been released, the toe angle adjusting motor and the steering intermediate shaft are drivingly connected with each other and, hence, the switching operation of the power transmitting system takes place smoothly.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 9 is an explanatory diagram showing the shape of a tip portion of a spline serrations employed in the standard splined shaft;

FIG. 10A is a side view showing a first structural example of an intermediate shaft of the steering axle drive unit;

FIG. 10B is a front view of the intermediate shaft shown in FIG. 10A;

FIG. 11A is a side view showing a second structural example of an intermediate shaft of the steering axle drive unit;

FIG. 11B is a front view of the intermediate shaft shown in FIG. 11A;

DESCRIPTION OF PREFERRED EMBODIMENTS

Figure 1:
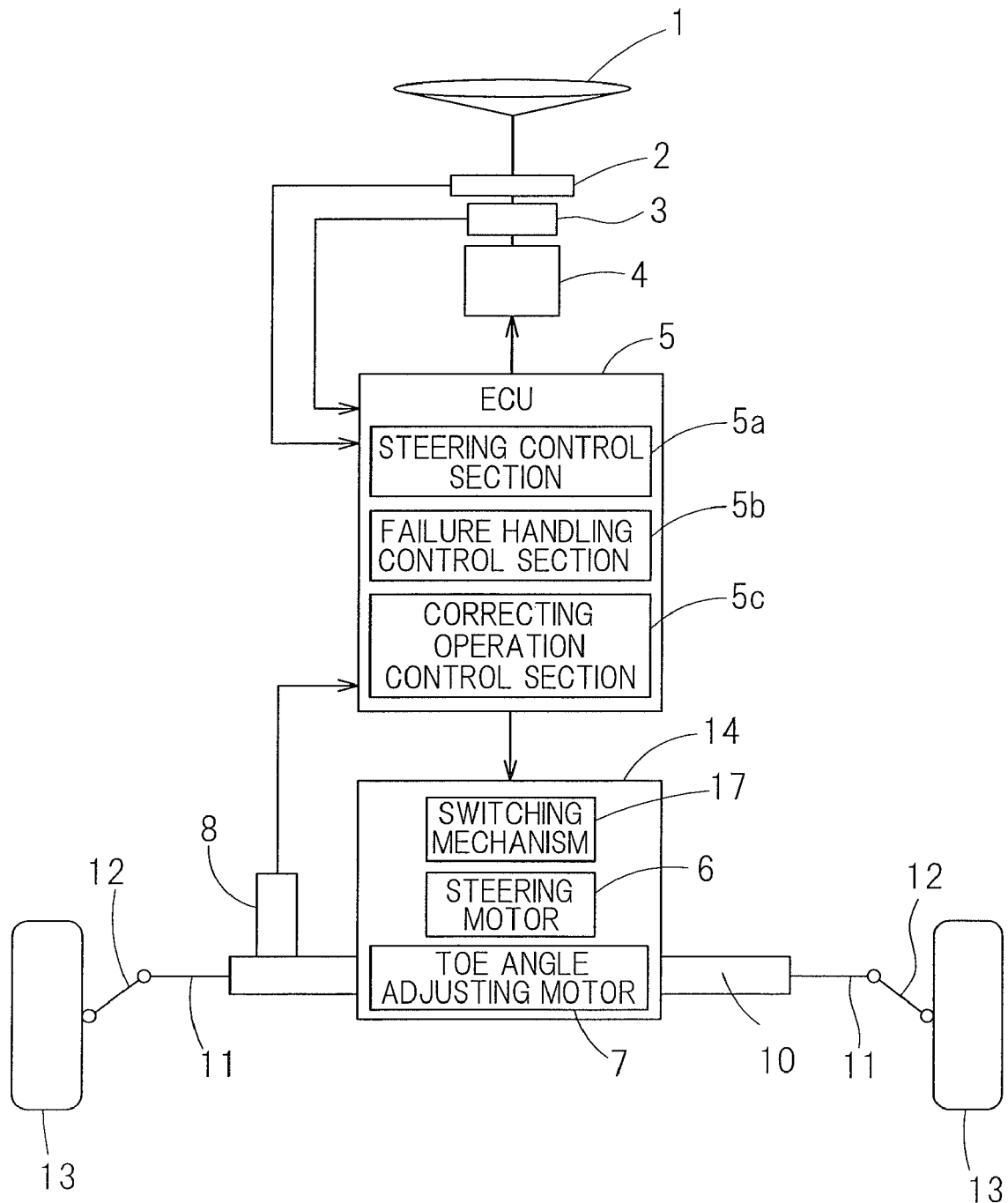
FIG. 1 is a block diagram showing a schematic structure of a steer-by-wire steering system designed in accordance with a first preferred embodiment of the present invention.

Referring particularly to FIG. 1, the steer-by-wire steering system designed in accordance with a first preferred embodiment of the present invention will be described in detail. As shown in a schematic representation in FIG. 1, an automotive vehicle includes a steering wheel 1 maneuvered by a vehicle driver, a steering angle sensor 2, a steering torque sensor 3, a steering reactive force motor 4, an axially displaceable steering axle or shaft 10 drivingly connected with left and right vehicle wheels 13 through knuckle arms 12 by way of tie rods 11, respectively, for steering the left and right vehicle wheels 13, a steering axle drive unit 14 for driving the steering axle 10, a wheel-turning angle sensor 8, and an electric control unit (ECU for short) 5. The electric control unit 5 in turn includes a steering control section 5a, a failure handling control section 5b and a correcting operation control section 5c. The electric control unit 5 and each of those control sections 5a, 5b and 5c are implemented by means of electronic circuits or the like including a vehicle mounted microcomputer and a software control program executed thereby.

The steering wheel 1 is not mechanically coupled with the steering axle 10 for wheel turning. The steering wheel 1 is provided with the steering angle sensor 2 and the steering torque sensor 3 and is connected with the steering reactive force motor 4. The steering angle sensor 2 is operable to detect the steering angle over which the steering wheel 1 is turned. The steering torque sensor 3 is operable to detect the steering torque acting on the steering wheel 1 when the latter is turned. The steering reactive force motor 4 is operable to apply a reactive torque to the steering wheel 1.

Figure 2:
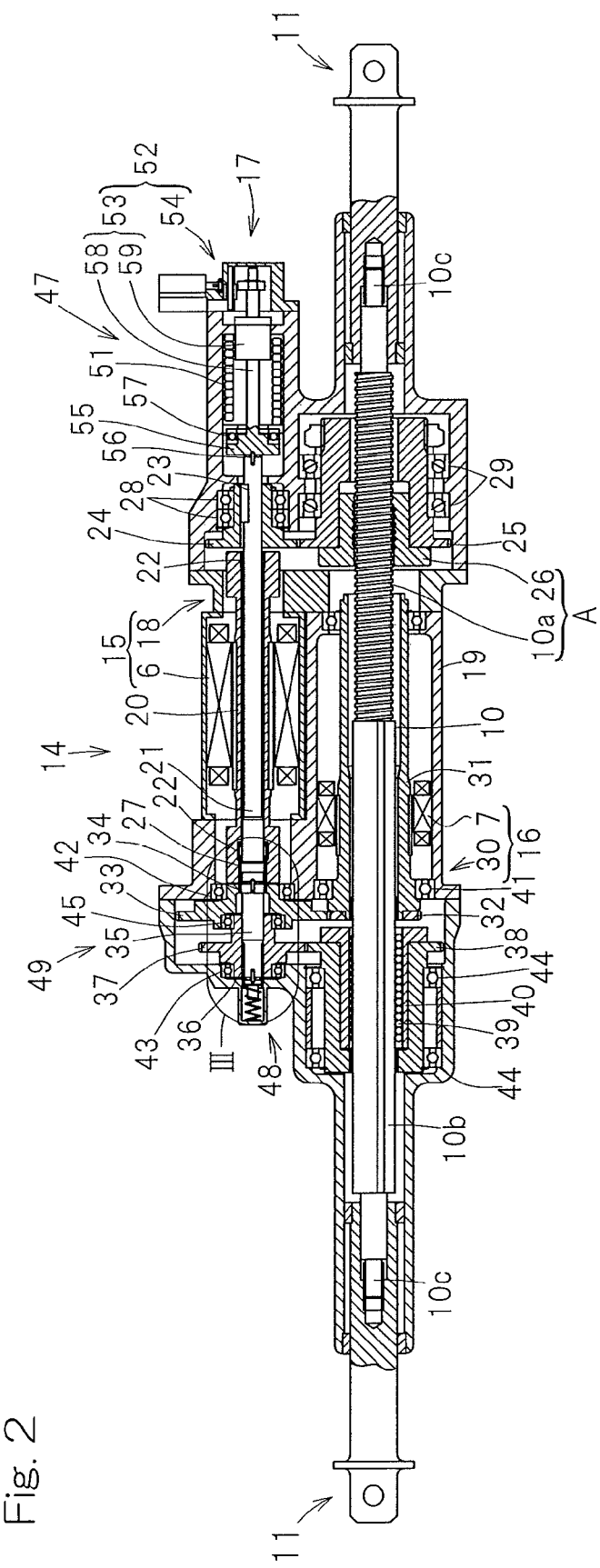
FIG. 2 is a horizontal sectional view showing a steering axle drive unit in the steer-by-wire steering system during a normal operation thereof.
Figure 3:
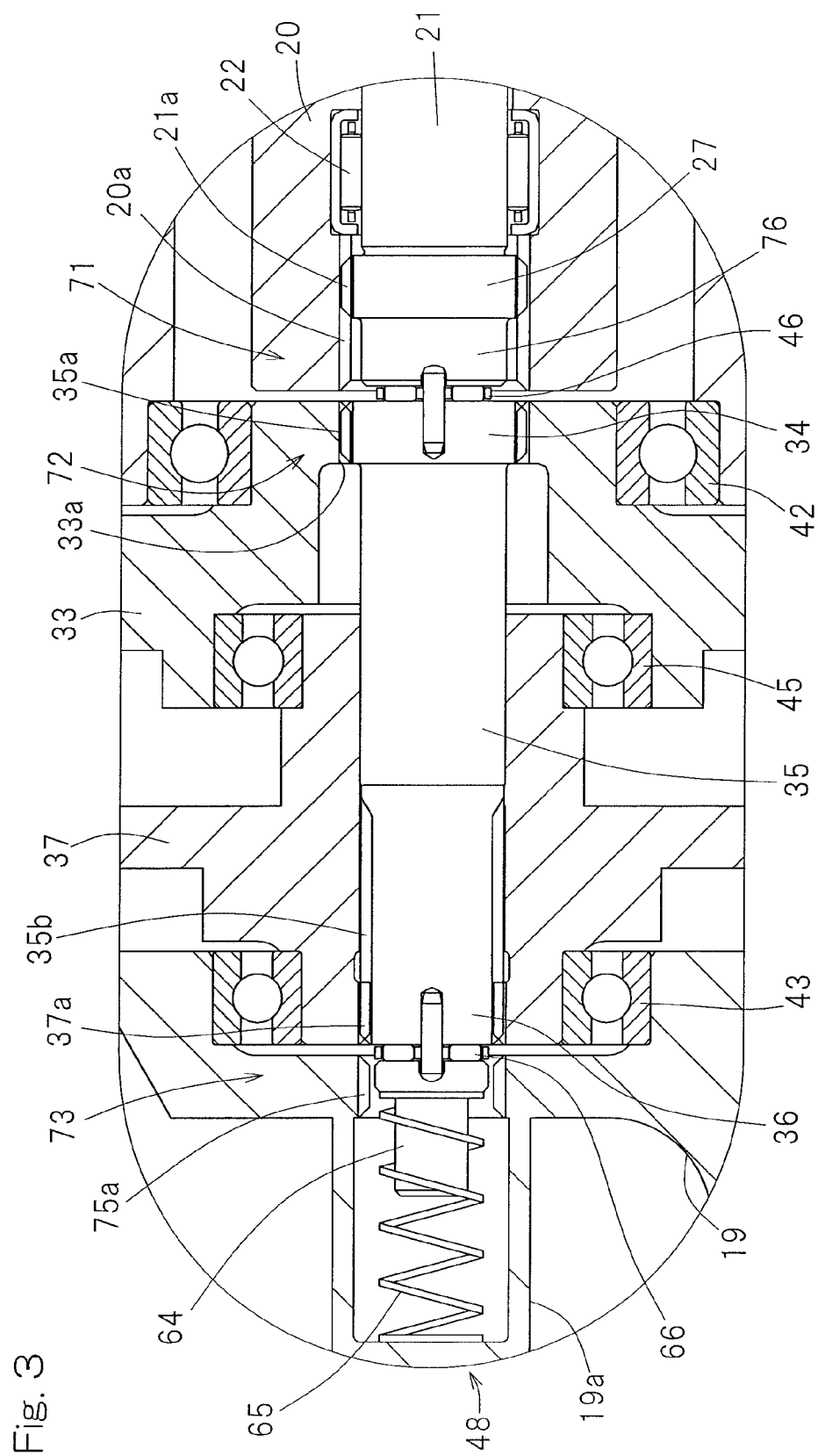
FIG. 3 is a fragmentary enlarged view showing a portion of the steering axle drive unit encompassed by the phantom oval III depicted in FIG. 2.

FIG. 2 illustrates a horizontal sectional view showing the steering axle drive unit 14 for driving the steering axle 10 during a normal condition and FIG. 3 illustrates a fragmentary enlarged view thereof. The steering axle drive unit 14 includes a steering mechanism 15 for driving the steering axle 10 in a direction axially thereof to turn the vehicle wheels 13 leftwards or rightwards, a toe angle adjusting mechanism 16 for adjusting the toe angle of each of the vehicle wheels 13, and a switching mechanism 17.

The steering mechanism 15 is made up of a steering motor 6 and a steering power transmitting mechanism 18 for displacing the steering axle 10 in a direction axially thereof in response to rotation of the steering motor 6.

Figure 4:
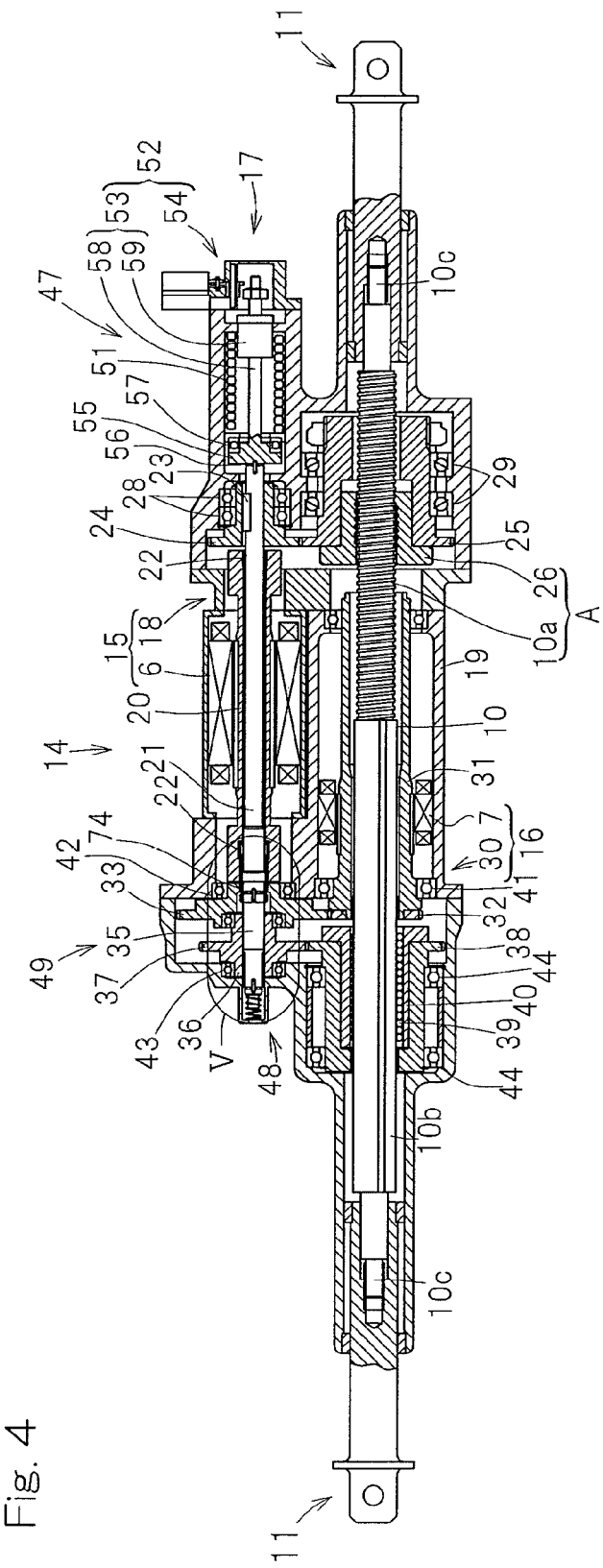
FIG. 4 is a schematic horizontal view of the steering axle drive unit in a condition assumed when a toe angle adjusting motor fails to operate properly.
Figure 5:
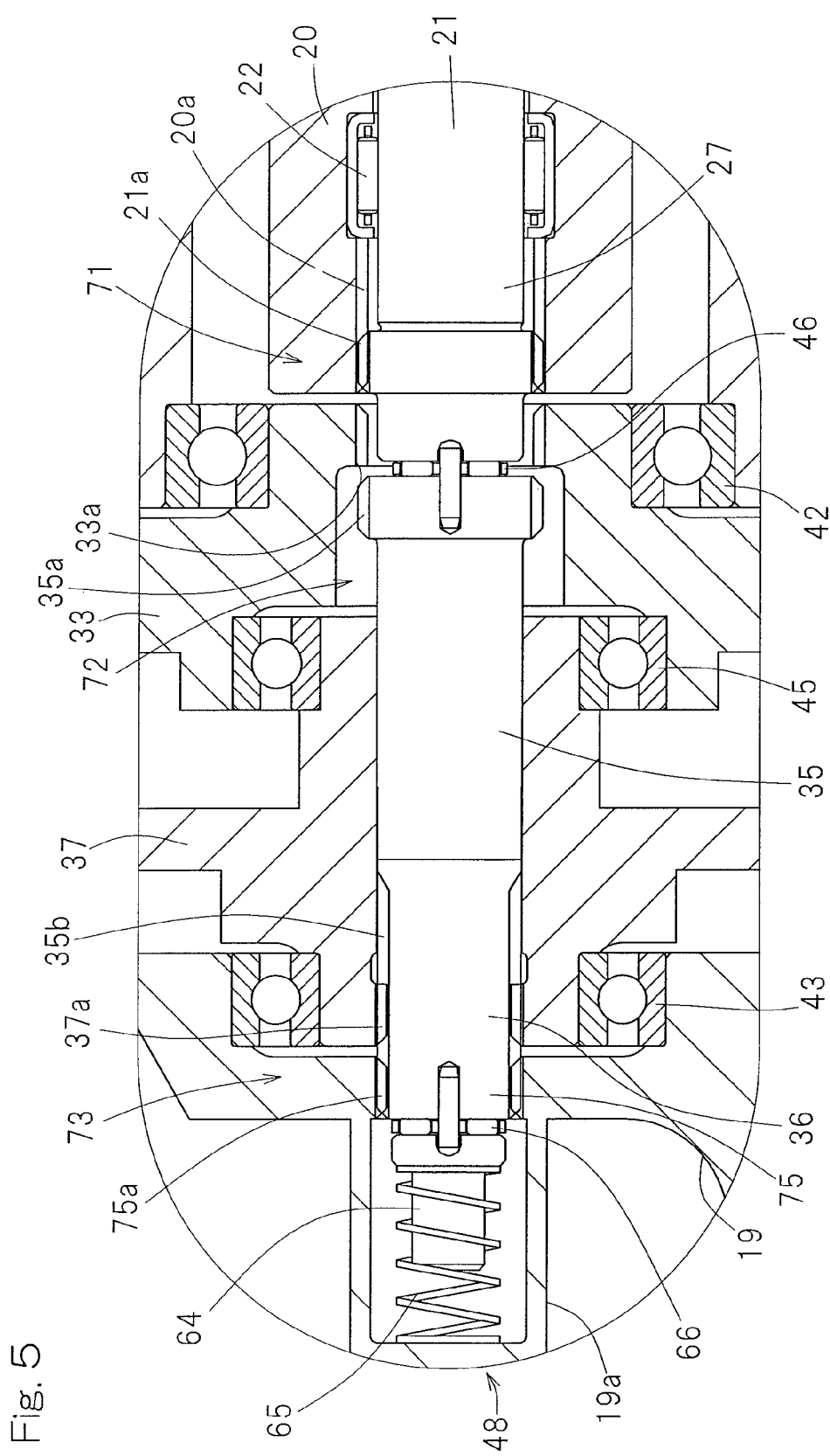
FIG. 5 is a fragmentary enlarged view showing a portion of the steering axle drive unit encompassed by the phantom oval V depicted in FIG. 4.
Figure 6:
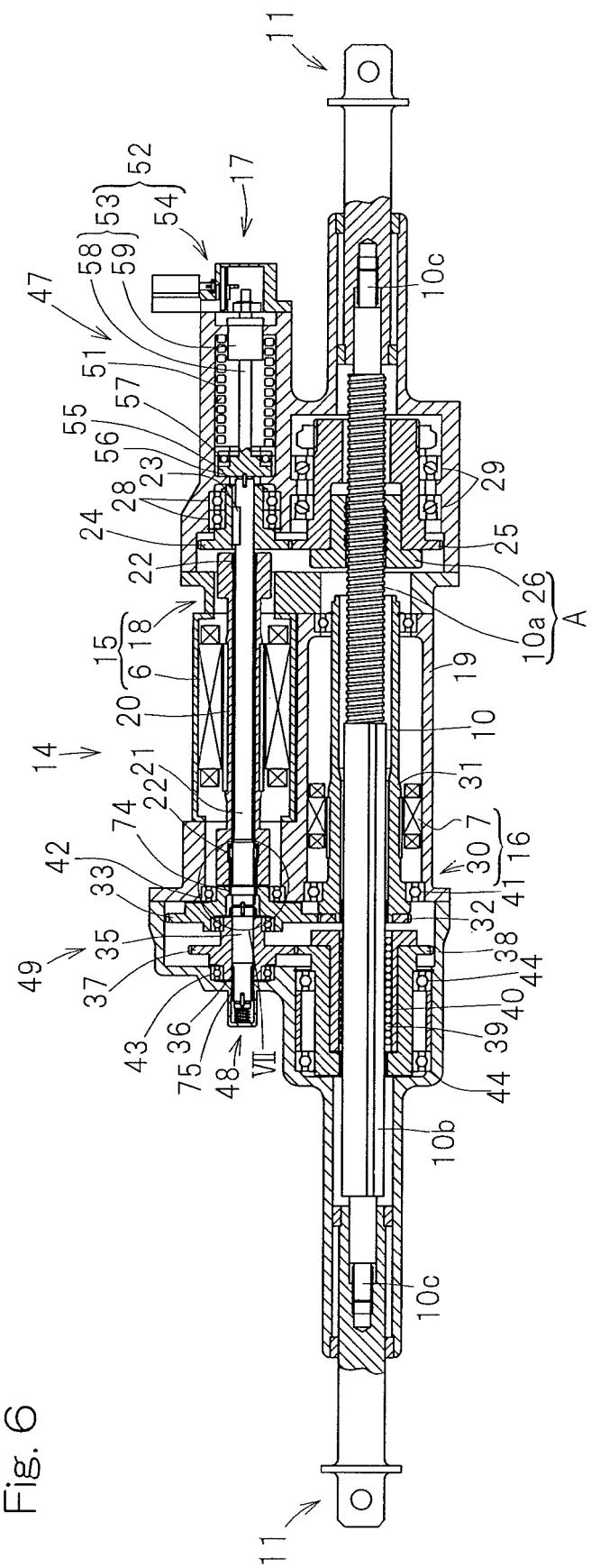
FIG. 6 is a horizontal sectional view showing the steering axle drive unit in the steer-by-wire steering system during failure of the steering motor.
Figure 7:
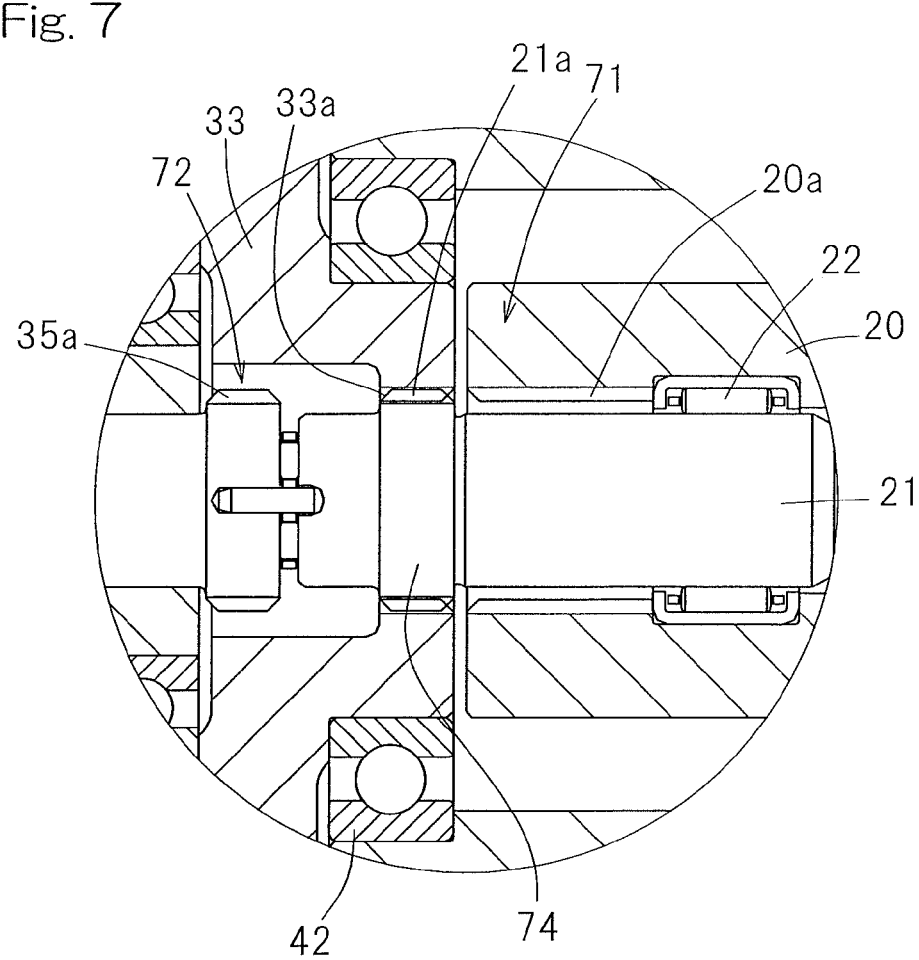
FIG. 7 is a fragmentary enlarged view showing a portion of the steering axle drive unit encompassed by the circle VII depicted in FIG. 6.

The steering motor 6 is accommodated within a housing 19 for the steering drive unit 14 in parallel relation with the steering axle 10. The steering motor 6 is a hollow motor and includes a tubular hollow motor shaft 20. Within the hollow of the hollow motor shaft 20, a steering intermediate shaft 21 disposed parallel to the steering axle 10 is supported through needle roller bearings 22 for movement in a direction axially thereof and also for rotation about its own longitudinal axis. The steering intermediate shaft 21 is selectively repositioned by a linear motion actuator 47 of the switching mechanism 17, as will be detailed later, together with a toe angle adjusting intermediate shaft 35, also as will be detailed later, to one of a reference position shown in FIGS. 2 and 3, a position at the time of failure of the toe angle adjusting motor as shown in FIGS. 4 and 5, and a position at the time of failure of the steering motor as shown in FIGS. 6 and 7 in the axial direction of such steering intermediate shaft 21.

The steering power transmitting mechanism 18 is made up of the hollow motor shaft 20 of the steering motor 6 which is a rotatable member for steering, the steering intermediate shaft 21, an output gear 24 mounted on the steering intermediate shaft 21 for rotation together therewith through a key 23, an input gear 25 meshed with the output gear 24, and a ball nut 26 secured to the input gear 25 and threadingly mounted on a ball screw shaft 10a of the steering axle 10. The ball screw shaft 10a and the ball nut 26 cooperate with each other to define a ball screw mechanism A. The hollow motor shaft 20 has an inner periphery formed with a plurality of spline teeth 20a in the form of internal teeth as shown in FIGS. 3, 5 and 7 whereas the steering intermediate shaft 21 has an outer periphery formed with a corresponding number of spline teeth or keys 21a also as shown in FIGS. 3, 5 and 7 and, accordingly, during a normal condition of the steering axle drive unit 14, the spline teeth 21a are engaged in the corresponding spline teeth 20a to permit the hollow motor shaft 20 to be rotatable together with the steering intermediate shaft 21. Thus, the spline teeth 20a and the spline teeth 21a cooperate with each other to define a splined engagement 27 to enable the hollow motor shaft 20 and the steering intermediate shaft 21 to rotate together. The spline teeth 20a in the hollow motor shaft 20 extend a substantial distance in the axial direction thereof and, therefore, the spline teeth 21a in the steering intermediate shaft 21 can engage in the spline teeth 20a at any axial location thereof.

During the normal condition of the steering axle drive unit 14, that is, at the time the steering axle drive unit 14 is functioning normally as shown in FIG. 2, the rotational drive of the steering motor 6 is transmitted to the ball nut 26 through the steering intermediate shaft 21, then through the output gear 24 and finally through the input gear 25 to thereby rotate the ball nut 26. The rotation of the ball nut 26 so induced causes the steering axle 10 to displace in the axial direction thereof to turn the vehicle wheel.

The input gear 24 is supported by the housing 19 through rolling bearings 28 and the output gear 25 is supported by the housing 19 through rolling bearings 29. Since as hereinbefore described the steering intermediate shaft 21 is mounted on the hollow motor shaft 20 of the steering motor 6 through the needle bearings 22 and has the output gear 24 mounted thereon through the key 23, the steering intermediate shaft 21 is permitted to move in the axial direction thereof.

The toe angle adjusting mechanism 16 is made up of a toe angle adjusting motor 7 and a toe angle adjusting power transmitting mechanism 30 for adjusting the toe angle in response to the rotation of the toe angle adjusting motor 7.

The toe angle adjusting motor 7 is fitted to the housing 19 of the steering axle drive unit 14 in a fashion coaxial with the steering axle 10. Even the toe angle adjusting motor 7 is a hollow motor having its tubular hollow motor shaft 31 provided on the outer periphery of the steering axle 10.

The toe angle adjusting power transmitting mechanism 30 is made up of an output gear 32 fixed to the hollow motor shaft 31, a first intermediate gear 33 meshed with the output gear 32, a toe angle adjusting intermediate shaft 35 engaged with the first intermediate gear 33 at a splined engagement 34, a second intermediate gear 37 meshed with the toe angle adjusting intermediate shaft 35 at a splined engagement 36, an input gear 38 meshed with the second intermediate gear 37, and spline nut 40 secured to the input gear 38 and splined to a splined axle portion 10b of the steering axle 10 through a plurality of balls 39. Both of the first intermediate gear 33 and the second intermediate gear 37 and the toe angle adjusting intermediate shaft 35 define the respective splined engagements 34 and 36 when spline teeth 33a and 37a (best shown in FIGS. 3, 5 and 7) in the form of internal teeth formed respectively in the first and second intermediate gears 33 and 37 and spline teeth 35a and 35b (best shown in FIGS. 3, 5 and 7) in the form of external teeth formed in the toe angle adjusting intermediate shaft 35 are meshed with each other. The spline teeth 35b in the toe angle adjusting intermediate shaft 35 extend a substantial distance in the axial direction thereof and, therefore, the spline teeth 37a in the second intermediate gear 37 can engage circumferentially with the spline teeth 35b at any axial location thereof. The first intermediate gear 33 is a toe angle adjusting drive member positioned on an outer periphery of the toe angle adjusting intermediate shaft 35 and adapted to be rotated by the toe angle adjusting motor 7 whereas the second intermediate gear 37 is a toe angle adjusting driven member for transmitting the rotation of the toe angle adjusting intermediate shaft 35 towards a downstream side.

During the normal condition of the steering axle drive unit 14, the rotational drive of the toe angle adjusting motor 7 is transmitted to the spline nut 40 through the hollow motor shaft 31, the output gear 32, the first intermediate gear 33, the toe angle adjusting intermediate shaft 35, the second intermediate gear 37 and finally through the input gear 38. The rotation of the spline nut 40 so induced in the manner described above causes the steering axle 10 to rotate so that the toe angle adjustment of the vehicle wheels 13 can be accomplished by the function of a toe angle adjustment male threaded portion 10c as will be described later.

The hollow motor shaft 31, the first intermediate gear 33, the second intermediate gear 37, and the input gear 38 are supported by the housing 19 through a rolling bearing 41, a rolling bearing 42, a rolling bearing 43 and a rolling bearing 44, respectively. Also, a rolling bearing 45 intervenes between the first intermediate gear 33 and the second intermediate gear 37 and the first and second gears 33 and 37 are rotatable relative to each other. Since the toe angle adjusting intermediate shaft 35 is meshed with the second intermediate gear 37 at the spline engagement 36 as hereinabove described, the axial movement thereof is permitted. The steering intermediate shaft 21 and the toe angle adjusting intermediate shaft 35 are coaxially juxtaposed to each other and a thrust bearing 46 best shown in FIGS. 3, 5 and 7 is interposed between respective adjacent ends of the steering intermediate shaft 21 and the toe angle adjusting intermediate shaft 35. Accordingly, the intermediate shafts 21 and 35 can be rotatable relative to each other.

It is to be noted that although in the illustrated embodiment described hereinabove, the splined axle portion 10b of the steering axle 10 and the spline nut 40 have been shown and described as held in rolling contact with each other through the balls 39, the both may be held in sliding contact with each other. In either case, the rotation can be favorably transmitted from the spline nut 40 to the splined axle portion 10b.

The toe angle adjusting mechanism 16 is, separate from the toe angle adjusting motor 7 and the toe angle adjusting power transmitting mechanism 30, provided with the toe angle adjustment male threaded portion 10c at each of the opposite ends of the steering axle 10, and the left or right tie rod 11 is theadingly coupled with the respective toe angle adjustment male threaded portion 10c. The toe angle adjustment male threaded portions 10c in the opposite ends of the steering axle 10 have respective helices opposite to each other such that when the steering axle 10 rotates in one direction, the left and right tie rods 11 can move axially outwardly to project, but when the steering axle 10 rotates in the opposite direction, the left and right tie rods 11 can move axially inwardly to retract. Each of the toe angle adjustment male threaded portions 10c has a helical tooth of a sectional shape representing a trapezoidal serration. Also, each of those toe angle adjustment male threaded portions 10c may be provided with a detent element.

Figure 14:
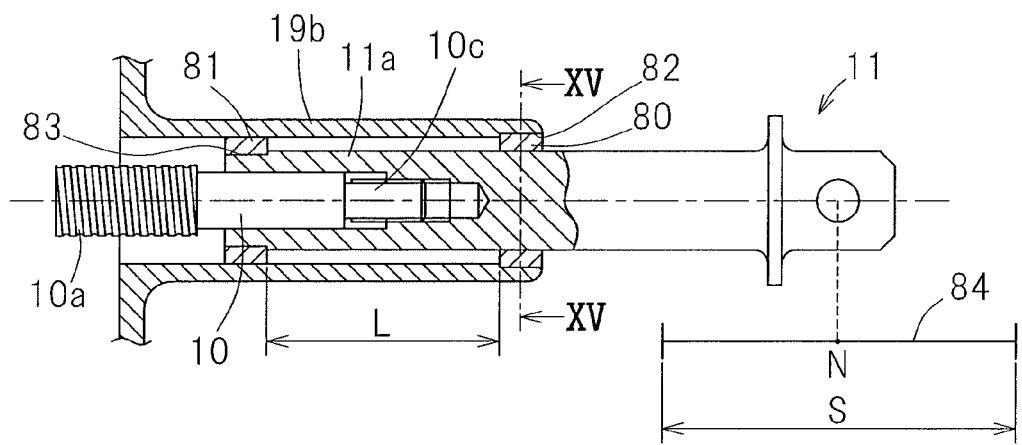
FIG. 14 is a sectional view showing, on an enlarged scale, a support of a nut employed in a tie rod in the steer-by-wire steering system.

As shown in FIG. 14 in an enlarged sectional representation, each of the tie rods 11 has one end portion formed with a nut portion 11a that is threadingly engaged in the corresponding toe angle adjusting male screw portion 10c. The nut portion 11a referred to above has an outer periphery covered by a tubular housing portion 19b protruding laterally outwardly of the housing 19, and a stationary slide bearing 80 and a movable slide bearing 81 are interposed between the tubular housing portion 19b and the nut portion 11a. Any of the stationary and movable slide bearings 80 and 81 is a slide bearing and, for the purpose of clarification and distinction, the terms "stationary" and "movable" are affixed to the slide bearing 80 and the slide bearing 81, respectively.

Figure 15:
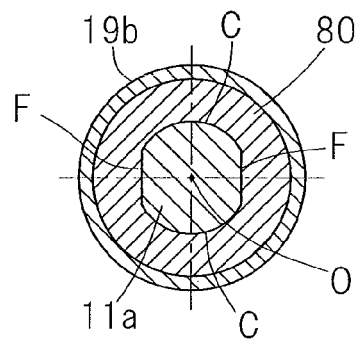
FIG. 15 is a cross sectional view taken along the line XV-XV in FIG. 14.

The stationary slide bearing 80 is fixed to a large diameter portion 82 formed in an axially outer end portion of an inner peripheral surface of the tubular housing portion 19b. As best shown in FIG. 15, the outer peripheral shape of the nut portion 11a in section perpendicular to a longitudinal axis thereof is such that a part of or the whole of the outer periphery represents a shape different from the circle depicted about an axis O. In the example now under discussion, opposite portions of the peripheral surface C are of a shape cut out by flat faces F. The stationary slide bearing 80 has an inner peripheral shape coinciding the outer peripheral shape of the nut portion 11a referred to previously. By this stationary slide bearing 80, the nut portion 11a is supported for sliding movement in the axial direction, but non-rotatable about the longitudinal axis.

As shown in FIG. 14, the movable slide bearing 81 is an annular member fixed to a reduced diameter portion 83 formed in an axially inner end portion of the outer peripheral surface of the nut portion 11a and is slidable along the inner peripheral surface of the tubular housing portion 19b. The distance L between respective end faces of the stationary and movable slide bearings 80 and 81, when the steering axle 10 is held at an intermediate position N of the range 84 of axial movement of the steering axle 10, at which the automotive vehicle is in position to travel straight forwards, is equal to or greater than half of the length S of the axial range 84. By so doing, even when the steering axle 10 is driven to one end of the range 84 of axial movement thereof, the stationary slide bearing 80 and the movable slide bearing 81 will not interfere with each other.

The use of the stationary and movable slide bearings 80 and 81 in the manner described above is effective to allow one of the tie rods 11 to move axially in a stabilized fashion when the steering axle 10 is to be axially moved and when the length of projection of one of the tie rods 11 is to be changed with the steering axle 10 then rotated. Also, since the stationary slide bearing 80 supports the nut portion 11*a* non-rotatably, the rotation of the steering axle 10 can be assuredly translated into the axial movement of any of the tie rods 11. Attention is called that the foregoing function can be obtained even with the only stationary slide bearing 80.

The switching mechanism 17, shown in FIG. 2, is operable to switch a power transmission system of the steering power transmitting mechanism 18 and the toe angle adjusting power transmitting mechanism 30 in the event of failure of the steering motor 6 or the toe angle adjusting motor 7. This switching mechanism 17 is made up of the steering intermediate shaft 21, the toe angle adjusting intermediate shaft 35, a linear motion actuator 47 for axially moving those intermediate shafts 21 and 35 together, an urging mechanism 48 for applying an urging force necessary to cause those intermediate shafts 21 and 35 to be held in contact with each other at all time, and a transmission coupling and decoupling mechanism 49 for coupling and decoupling a transmission coupling site of each of the steering power transmitting mechanism 18 and the toe angle adjusting power transmitting mechanism 30 by means of the movement of the switching and toe angle adjusting intermediate shafts 21 and 35.

The linear motion actuator 47 is comprised of a spring member 51 and a spring coupling and decoupling mechanism 52. The spring coupling and decoupling mechanism 52 is in turn comprised of a linear to rotary motion translating mechanism 53 for translating a linear motion of the spring member 51 into a rotary motion, and a rotation regulating mechanism 54 for regulating the rotary motion obtained from the linear to rotary motion translating mechanism 53.

In the instance now under discussion, the spring member 51 is employed in the form of a compression coil spring and is used to bias a support member 55 in a direction leftwards as viewed in FIGS. 2, 4 and 6. In other words, one end of the spring member 51 on the side adjacent the support member 55 undergoes a linear motion in a direction leftwards and rightwards. The support member 55 is juxtaposed coaxial with the steering intermediate shaft 21. A thrust bearing 56 and a thrust roller bearing 57 are interposed between the support member 55 and the steering intermediate shaft 21 and between the support member 55 and the spring member 51, respectively, and, hence, the support member 55 is rotatable about a longitudinal center axis.

Also, in the instance now under discussion, the linear to rotary motion translating mechanism 53 is employed in the form of a ball screw mechanism and is comprised of a ball screw shaft 58 integral with the support member 55 and a ball nut 59 threadingly engaged with the ball screw shaft 58. It is, however, to be noted that the linear to rotary motion translating mechanism 53 may be of any construction other than the ball screw mechanism and may be employed in the form of, for example, a combination of a rack and a pinion.

Figure 8A:
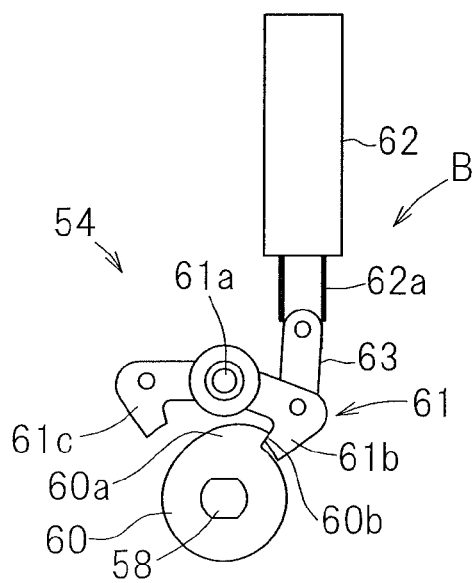
FIG. 8A is a side view showing a rotation regulating mechanism of the steering axle drive unit in one condition.
Figure 8B:
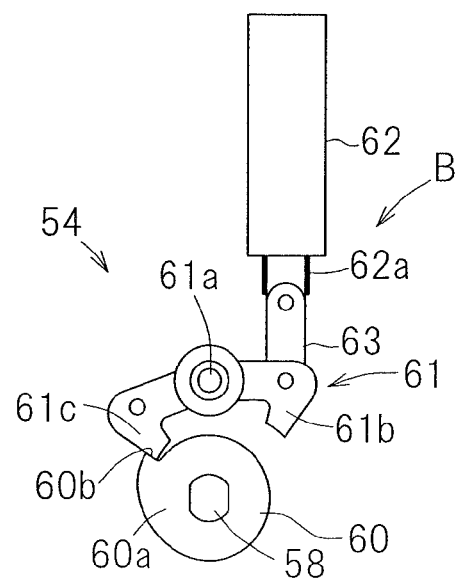
FIG. 8B is a side view showing a rotation regulating mechanism of the steering axle drive unit in a different condition.

As shown in FIGS. 8A and 8B, the rotation regulating mechanism 54 is made up of a projection 60 provided in the ball screw shaft 58 which is a rotary shaft, a lever 61 capable of playing a role of halting the rotation of the ball screw shaft 58 when engaged with the projection 60, and a rotation regulating drive source 62 for actuating the lever 61. The projection 60 is a plate-like member having a portion of its outer periphery protruding radially outwardly beyond the remaining portion to define a projecting piece 60*a*, and the projecting piece 60*a* of the projection 60 has a circumferential end formed with a stepped face 60*b* with which the lever 61 is engaged. Strictly speaking, the projecting piece 60*a* of the projection 60 is nothing other than a projection with which the lever 61 is engaged. The lever 61 is provided rotatable about a pivot center pin 61*a* extending parallel to the ball screw shaft 58 and has a pair of engagement pawls 61*b* and 61*c* engageable with the projecting piece 60*a* of the projection 60 selectively one at a time. The rotation regulating drive source 62 is employed in the form of a linear motion actuator such as, for example, a linear solenoid. This rotation regulating drive source 62 includes an advancing and retracting rod 62*a* reciprocally movable in one direction (a direction upwardly and downwardly), and this advancing and retracting rod 62*a* is operatively coupled with the lever 61 through a connecting link 63.

FIG. 8A illustrates the rotation regulating mechanism 54 during the normal condition of the steering axle drive unit 14. In this condition, one of the engagement pawls, that is, the engagement pawl 61*b* is engaged with the projecting piece 60*a* of the projection 60 such that the rotation of the projection 60 and the ball screw shaft 58 integral therewith are constrained. For this reason, by the action of the linear and rotary motion translating mechanism 53 comprised of the ball screw mechanism, the ball screw shaft 58 is unable to move in the axial direction and the spring member 51 best shown in FIG. 2 is restrained from urging the support member 55. In other words, the spring member 51 is held in a compressed state and in a non-urging condition unable to urge the intermediate shafts 21 and 35 in the axial direction.

When starting from the condition as shown in FIG. 8A the advancing and retracting rod 62*a* of the rotation regulating drive source 62 is retracted, the engagement between the pawl 61*b* of the lever 61 and the projecting piece 60*a* of the projection 60 is released, allowing the ball screw shaft 58 to be ready to rotate. Accordingly, by the elastic force of repulsion exerted by the spring member 51, the ball screw shaft 58 moves in the leftward direction as viewed in FIG. 2 while rotating relative to the ball nut 59. In other words, the spring member 51 is released from the compressed state and is brought in a condition applying the biasing force to the intermediate shafts 21 and 35 to move the latter in the axial direction. When the projection 60 is rotated only a predetermined phase, the projecting piece 60*a* of the projection 60 is engaged with the other engagement pawl 61*c* of the lever 61 to thereby restrain the projection 60 and the ball screw shaft 58 from rotating. During this period, the intermediate shafts 21 and 35 are moved axially in the leftward direction to assume the position at the time of failure of the toe angle adjusting motor as shown in FIGS. 4 and 5.

When starting from the condition as shown in FIG. 8B the advancing and retracting rod 62*a* of the rotation regulating drive source 62 is advanced, the engagement between the engagement pawl 61*c* of the lever 61 and the projecting piece 60*a* of the projection 60 is released, allowing the ball screw shaft 58 to be ready to rotate. Accordingly, in a manner as described above, a condition is established in which the spring member 51 urges the intermediate shafts 21 and 35 to move in the axial direction and the intermediate shafts 21 and 35 are axially moved in the leftward direction. Incident to the leftward movement of the intermediate shafts 21 and 35 in the manner described above, the axial positions of the lever 61 and the projection 60 are disengaged from each other. For this reason, even when the projection 60 rotates, the projecting piece 60*a* does not engage any of the engagement pawls 61*b* and 61*c* and the spring member 51 moves to a linear motion range end. The positions of the intermediate shafts 21 and 35, when the spring member 51 has moved to the linear motion range end, is a steering motor failure position shown in FIGS. 6 and 7.

The spring coupling and decoupling mechanism 52 referred to previously, when viewed in terms of its function, may be explained as follows. Specifically, the spring decoupling mechanism 52 is made up of an obstructing element and an obstructing element removing mechanism B for removing the obstructing element. The obstructing element is disposed within the linear motion range of the spring member 51, or within a motion range of the ball screw shaft 58, which is a member capable of undergoing the linear movement together with the spring member 51, and capable of disturbing the linear movement. The obstructing element removing mechanism B operates to release the spring member 51 from the compressed state. In the case of this embodiment, the obstructing element is the lever 61 which, when engaged with the projection 60 fitted to the ball screw shaft 58, disturbs the linear movement of the ball screw shaft 58. The obstructing element removing mechanism B is a combination of the rotation regulating drive source 62 and the connecting link 63, which combination functions to remove the lever 61, which is the obstructing element and is protruding within the movement range of the ball screw shaft 58.

The urging mechanism 48 referred to previously is made up of a pressing shaft 64 arranged in the neighborhood of the toe angle adjusting intermediate shaft 35 in a fashion coaxial with the steering and toe angle adjusting intermediate shafts 21 and 35, and a coil spring 65 for elastically urging the pressing shaft 64 towards the side required for the pressing shaft 64 to be urged to the toe angle adjusting intermediate shaft 35. The pressing shaft 64 and the coil 65 are accommodated within a urging mechanism container 19*a* which forms a part of the housing 19. A thrust bearing 66 is disposed between respective shaft ends of the pressing shaft 64 and the toe angle adjusting intermediate shaft 35, whereby the toe angle adjusting intermediate shaft 35 becomes rotatable relative to the pressing shaft 64.

The transmission coupling and decoupling mechanism 49 includes first, second and third transmission coupling and decoupling mechanisms 71, 72 and 73 as shown in FIGS. 3, 5 and 7. The first transmission coupling and decoupling mechanism 71 is made up of the hollow motor shaft 20 of the steering motor 6, which shaft 20 is a steering rotatable member, the steering intermediate shaft 21, and the first intermediate gear 33 which is a toe angle adjusting drive member. When the intermediate shafts 21 and 35 are held at the reference position as shown in FIGS. 2 and 3, and at the position at the time of failure of the toe angle adjusting motor as shown in FIGS. 4 and 5, the spline teeth 20*a* of the hollow motor shaft 20 and the spline teeth 21*a* of the steering intermediate shaft 21 are engaged with each other to form the spline engagement 27 through which the hollow motor shaft 20 and the steering intermediate shaft 21 are connected with each other. However, when the intermediate shafts 21 and 35 are held at the position at the time of failure of the steering motor as shown in FIGS. 6 and 7, the spline teeth 21*a* of the steering intermediate shaft 21 and the spline teeth 20*a* of the hollow motor shaft 20 are disengaged from each other and the spline teeth 21*a* of the steering intermediate shaft 21 are meshed with the spline teeth 33*a* of the first intermediate gear 33 to form the spline engagement 74 through which the steering intermediate shaft 21 is connected with the first intermediate gear 33.

The second transmission coupling and decoupling mechanism 72 referred to above is made up of the steering intermediate shaft 21, the first intermediate gear 33 which is a toe angle adjusting drive member and the toe angle adjusting intermediate shaft 35. When the intermediate shafts 21 and 35 are held at the reference position as best shown in FIGS. 2 and 3, the spline teeth 33*a* of the first intermediate gear 33 and the spline teeth 35 of the toe angle adjusting intermediate shaft 35 are meshed with each other to form the spline engagement 34 through which the first intermediate gear 33 and the toe angle adjusting intermediate shaft 35 are connected with each other. However, when the intermediate shafts 21 and 35 are held at the position at the time of failure of the toe angle adjusting motor best shown in FIGS. 4 and 5 and at the position at the time of failure of the steering motor best shown in FIGS. 6 and 7, the engagement at the spline engagement 34 is released and, therefore, the first intermediate gear 33 and the toe angle adjusting intermediate shaft 35 are disconnected from each other.

The third transmission coupling and decoupling mechanism 73 referred to above is made up of the toe angle adjusting intermediate shaft 35, the second gear 37 which is the toe angle adjusting driven member, and the housing 19. The urging mechanism container 19*a* of the housing 19 has a base end formed with spline teeth 75*a* (as shown in FIGS. 3 and 5) in the form of internal teeth. When the intermediate shafts 21 and 25 are held at the reference position as shown in FIGS. 2 and 3, the spline teeth 35*b* of the toe angle adjusting intermediate shaft 35 and the spline teeth 37*a* of the second intermediate gear 37 are meshed with each other to form the spline engagement 36 through which the toe angle adjusting intermediate shaft 35 and the second intermediate gear 37 are connected with each other. However, when the intermediate shafts 21 and 35 are held at the position at the time of failure of the toe angle adjusting motor as shown in FIGS. 4 and 5, and at the position at the time of failure of the steering motor as shown in FIG. 6, in addition to the above described spline engagement 36, the spline teeth 35*b* of the toe angle adjusting intermediate shaft 35 and the spline teeth 75*a* of the housing 19 are meshed with each other to form the spline engagement 75. Through this spline engagement 75, the toe angle adjusting intermediate shaft 35 is coupled with the housing 19 and is hence constrained from rotating.

Positional relationships of the various member are so set up that during the switching operation of the above described transmission coupling and decoupling mechanism 49 and in the course of the intermediate shafts 21 and 35 being moved axially from the reference position towards the position at the time of failure of the steering motor, the toe angle adjusting intermediate shaft 35 can be connected with the housing 19 at a timing earlier than the disengagement of the toe angle adjusting intermediate shaft 35 from the first intermediate gear 33.

Figure 12A:
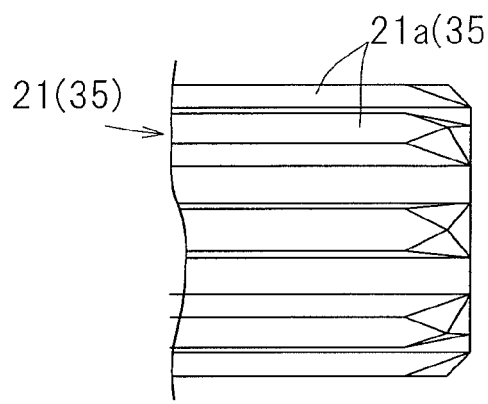
FIG. 12A is a side view showing a third structural example of an intermediate shaft of the steering axle drive unit.
Figure 12B:
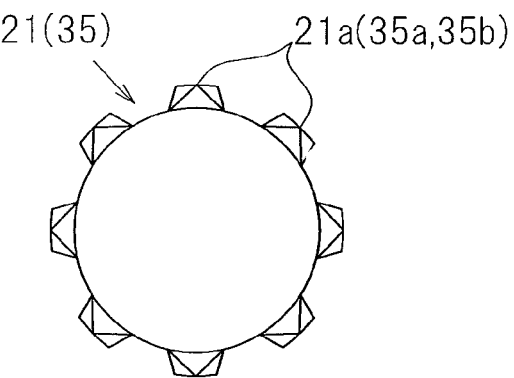
FIG. 12B is a front view of the intermediate shaft shown in FIG. 12A.

In order to allow the switching operation of the transmission switching mechanism 49 to take place smoothly, the spline teeth 21*a* of the steering intermediate shaft 21 and the spline teeth 35*a* of the toe angle adjusting intermediate shaft 35 do not have tooth tips of a flat shape such as represented by spline teeth 80*a* in the standard splined shaft 80 as shown in FIG. 9. Rather, the spline teeth 21*a* of the steering intermediate shaft 21 and the spline teeth 35*a* of the toe angle adjusting intermediate shaft 35 have their tooth tips representing preferably an acute angled shape as shown in, for example, FIGS. 10A and 10B showing a first structural example or as shown in, for example, FIGS. 11A and 11B showing a second structural example. Alternatively, as alternative examples, the tooth tips of the spline teeth 21a, 35a and 35b are preferably so shaped as to represent a tapered shape with no projection in the teeth tip, as shown in, for example, FIGS. 12A and 12B showing a third structural example or as shown in, for example, FIGS. 13A and 13B showing a fourth structural example.

Figure 13A:
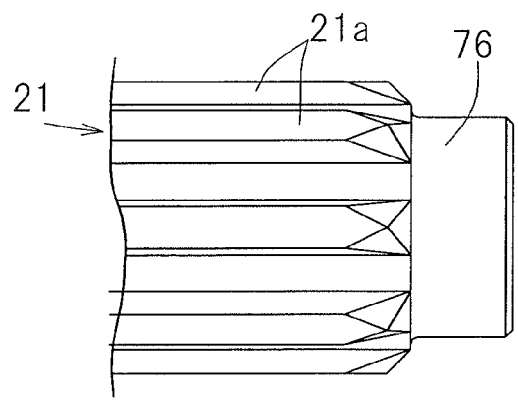
FIG. 13A is a side view showing a fourth structural example of an intermediate shaft of the steering axle drive unit.
Figure 13B:
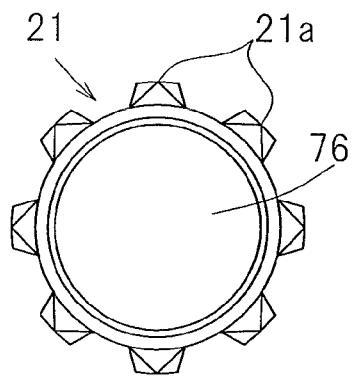
FIG. 13B is a front view of the intermediate shaft shown in FIG. 13A.

It is, however, to be noted that, as is the case with the second structural example shown in FIGS. 11A and 11B or with the fourth structural example shown in FIGS. 13A and 13B, one end of the steering intermediate shaft 21 facing the toe angle adjusting intermediate shaft 35 may be provided with a projecting portion 76 protruding towards a shaft end side of the spline teeth 21a. The projecting portion 76 has an outer diameter smaller than the tooth bottom radius of the spline teeth 21a. The use of such a projecting portion 76 in the end of the steering intermediate shaft 21 facing the toe angle adjusting intermediate shaft 35 is effective in that when the steering intermediate shaft 21 and the toe angle adjusting intermediate shaft 35 are switched in position from the reference position towards the position at the time of failure of the steering motor, the spline teeth 35a of the toe angle adjusting intermediate shaft 35 can be first disengaged from the spline teeth 33a of the first intermediate gear 33 by a quantity corresponding to the axial length of the projecting portion 76 and spline teeth 21a of the steering intermediate shaft 21 can be subsequently engaged with the spline teeth 33a of the first intermediate gear 33. In other words, the driving connection between the toe angle adjusting motor 7 and the toe angle adjusting intermediate shaft 35 is first released, followed by the driving connection established between the toe angle adjusting motor 7 and the steering intermediate shaft 21. It is to be noted that the steering axle drive unit 14 shown in FIGS. 2 to 7 makes use of the steering intermediate shaft 21 having its shaft end shape shown in and described with reference to FIGS. 11A and 11B in connection with the second structural example, or to FIGS. 13A and 13B in connection with the fourth structural example.

The steering control section 5a of the electric control unit 5 controls the steering reactive force motor 4, the steering motor 6 and the toe angle adjusting motor 7. In other words, the steering control section 5a operates, based on a signal of the steering angle from the steering angle sensor 2, and a signal of the vehicle rotational speed generated from a vehicle speed sensor (not shown) and various signals generated from corresponding sensors used to detect the driving status, to set a target steering reactive force, then to feed back a steering torque, detected by the steering torque sensor 3, so that the actual steering reactive force may coincide with the target steering reactive force, and finally to control the steering reactive force motor 4.

The failure handling control section 5b referred to previously controls the rotation regulating drive source 62 of the switching mechanism 17. In other words, the failure handling control section 5b operates in response to detection of the failure of the steering motor 6 and the failure of the toe angle adjusting motor 7 to activate the rotation regulating drive source 62 so that the steering and toe angle adjusting intermediate shafts 21 and 35 can be axially moved from the reference position towards the position at the time of failure of the steering motor or toward the position at the time of failure of the toe angle adjusting motor.

The correcting operation control section 5c referred to previously performs a correction of the control to axially move the intermediate shafts 21 and 35 that is performed by the failure handling control section 5b described above. More specifically, when the rotation of the toe angle adjusting intermediate shaft 35 is to be constrained with the spline teeth 35b of the toe angle adjusting intermediate shaft 35 engaged with the spline teeth 75a of the housing 19 to form the spline engagement 75, the toe angle adjusting intermediate shaft 35 is rotated by the toe angle adjusting motor 7 an angular distance equal to or greater than one pitch of the neighboring spline teeth 35b, to thereby align the respective phases of the spline teeth 35b and the spline teeth 75a with each other. With the correcting operation effected in the manner described above, fixture of the toe angle adjusting intermediate shaft 35 to the housing 19 can be smoothly accomplished with no error occurring.

In the description that follows, the operation taking place in the steering axle drive unit 14 of the steer-by-wire steering system of the structure described hereinbefore will be described. In the event that the steering motor 6 and the toe angle adjusting motor 7 are functioning normally, the rotation of the hollow motor shaft 20 of the steering motor 6 is transmitted to the ball nut 26 through the steering power transmitting mechanism 18 and, at the same time, the rotation of the hollow motor shaft 31 of the toe angle adjusting motor 7 is transmitted to the spline nut 40 through the toe angle adjusting power transmitting mechanism 30. The rotation of the ball nut 26 threadingly engaged with the ball screw shaft 10a of the steering axle 10 causes the steering axle 10 to move axially and the vehicle wheels 13 are accordingly steered. Since the spline nut 40 of the toe angle adjusting power transmitting mechanism 30 is splined to the splined axle portion 10b of the steering axle 10, the steering axle 10 is permitted to move axially. The rotation of the spline nut 40 then threadingly mounted on the spline shaft portion 10b of the steering axle 10 results in a rotation of the steering axle 10, wherefore the tie rods 11 threadingly engaged with the toe angle adjusting male threaded portions 10c in the opposite end portions of the steering axle 10 are advanced or retracted to accomplish the toe angle adjustment.

In the event of failure of the toe angle adjusting motor 7, the rotation regulating drive source 62 of the switching mechanism 17 is activated in response to a command from the failure handling control section 5b of the electric control unit 5 to switch the rotation regulating mechanism 54 from the condition shown in FIG. 8A over to the condition shown in FIG. 8B. By so doing, by the effect of the elastic force of repulsion of the spring member 51 forming the linear motion actuator 47, the intermediate shafts 21 and 35 are axially moved to and then halted at the position at the time of failure of the toe angle adjusting motor.

At the position at the time of failure of the toe angle adjusting motor, the steering intermediate shaft 21 is retained by the first transmission coupling and decoupling mechanism 71 as connected with the hollow motor shaft 20 and, on the other hand, the toe angle adjusting intermediate shaft 35 is disconnected by the second transmission coupling and decoupling mechanism 72 from the first intermediate gear 33, but the toe angle adjusting intermediate shaft 35 is connected by the third transmission coupling and decoupling mechanism 73 as connected with the housing 19. In other words, the toe angle adjusting power transmitting mechanism 30 is brought in position unable to transmit the motion, and at the same time, the toe angle adjusting intermediate shaft 35 is restrained from rotating. As a result, only the steering is performed by the steering motor 6. As hereinbefore described, the steering axle drive unit 14 is provided with the steering intermediate shaft 21 of the shaft end shape shown in FIGS. 11A and 11B or FIGS. 13A and 13B, and the toe angle adjusting motor 7 and the steering intermediate shaft 21 are drivingly connected with each other after the driving connection between the toe angle adjusting motor 7 and the toe angle adjusting intermediate shaft 35 have been released, and therefore, the switching of the power transmission system can take place smoothly.

In the event of failure of the steering motor 6, the rotation regulating drive source 62 of the switching mechanism 17 is activated in response to a command from the failure handling control section 5b of the electric control unit 5 to switch the rotation regulating mechanism 54 from the condition shown in FIG. 8A back to the condition shown in FIG. 8A by way of the condition shown in FIG. 8B. By so doing, by the effect of the elastic force of repulsion of the spring member 51, the intermediate shafts 21 and 35 are axially moved towards the position at the time of failure of the steering motor, shown in FIGS. 6 and 7, by way of the position at the time of failure of the toe angle adjusting motor.

At the position at the time of failure of the steering motor, by the first transmission coupling and decoupling mechanism 71 and the second transmission coupling and decoupling mechanism 72, the connection between the steering intermediate shaft 21 and the hollow motor shaft 20 and the connection between the toe angle adjusting intermediate shaft 35 and the first intermediate gear 33 are released and, instead, the steering intermediate shaft 21 is connected with the first intermediate gear 33 and, on the other hand, the toe angle adjusting intermediate shaft 35 is connected by the third transmission coupling and decoupling mechanism 73 with the housing 19. In other words, the steering motor 6 is disengaged from the steering power transmitting mechanism 18 and the toe angle adjusting intermediate shaft 35 is refrained from rotating, allowing the steering intermediate shaft 21 to be connected with the toe angle adjusting power transmitting mechanism 30. Accordingly, in place of the steering motor 6, the rotation of the toe angle adjusting motor 7 can be transmitted to the steering power transmitting mechanism 18 so as to enable steering.

As described hereinabove, with the steer-by-wire steering system of the embodiment, in the event of failure of the steering motor 6, the switching mechanism 17 disengages the steering motor 6 from the steering power transmitting mechanism 18 and, at the same time, change of the toe angle is refrained, and the rotation of the toe angle adjusting motor 7 rather than the steering motor 6 is transmitted to the steering power transmitting mechanism 18 to enable the steering to be accomplished and, accordingly, it can have a failsafe functionality by which even at the event of failure of the steering motor the steering can be accomplished. Also, by the switching mechanism 17, in the event of failure of the toe angle adjusting motor 7, the toe angle adjusting power transmitting mechanism 30 can be held in a motion transmission disabled condition to allow the steering motor 6 to perform solely the steering, and, accordingly, in the event of failure of the toe angle adjusting motor, the toe angle adjusting mechanism 16 is frozen to enable a safe traveling. A series of operations of switching of the power transmission system of the steering power transmitting mechanism 18 and the toe angle adjusting power transmitting mechanism 30 at the time of failure of the steering motor or the toe angle adjusting motor are assuredly performed by the transmission coupling and decoupling mechanism 49 when the steering and toe angle adjusting intermediate shafts 21 and 35 are axially moved by the linear motion actuator 47.

Since the hollow motor is employed for the steering motor 6 and, also, for the toe angle adjusting motor 7, the steering intermediate shaft 21 and the steering axle 10 can be inserted through the respective hollows of the hollow motors 6 and 7. For this reason, the various component parts of the steer-by-wire steering system can be snugly and neatly accommodated in a limited available space, allowing the entire structure to be assembled compact. It is, however, to be noted that the component parts of the switching mechanism 17 except for the steering intermediate shaft 21 may be arranged within the hollow of the steering motor 6 and that only one of the steering motor 6 and the toe angle adjusting motor 7 may be a hollow motor. Also, the switching mechanism 17 can be assembled compact, since the steering intermediate shaft 21 and the toe angle adjusting intermediate shaft 35 are axially movably arranged in coaxial relation with each other and those intermediate shafts 21 and 35 are together made movable axially by the linear motion actuator 47.

It is to be noted that since the toe angle adjustment by the toe angle adjusting motor 7 and the alternate use of the toe angle adjusting motor 7 in place of the steering motor 6 in the event of failure of the steering motor 6 are performed while the system mounted automotive vehicle is travelling, the maximum generated torque thereof is far lower than the torque required by the steering motor 6 at the time of steering without driving. Accordingly, the toe angle adjusting motor 7 is sufficiently used even when it is smaller than the steering motor 6.

Figure 16:
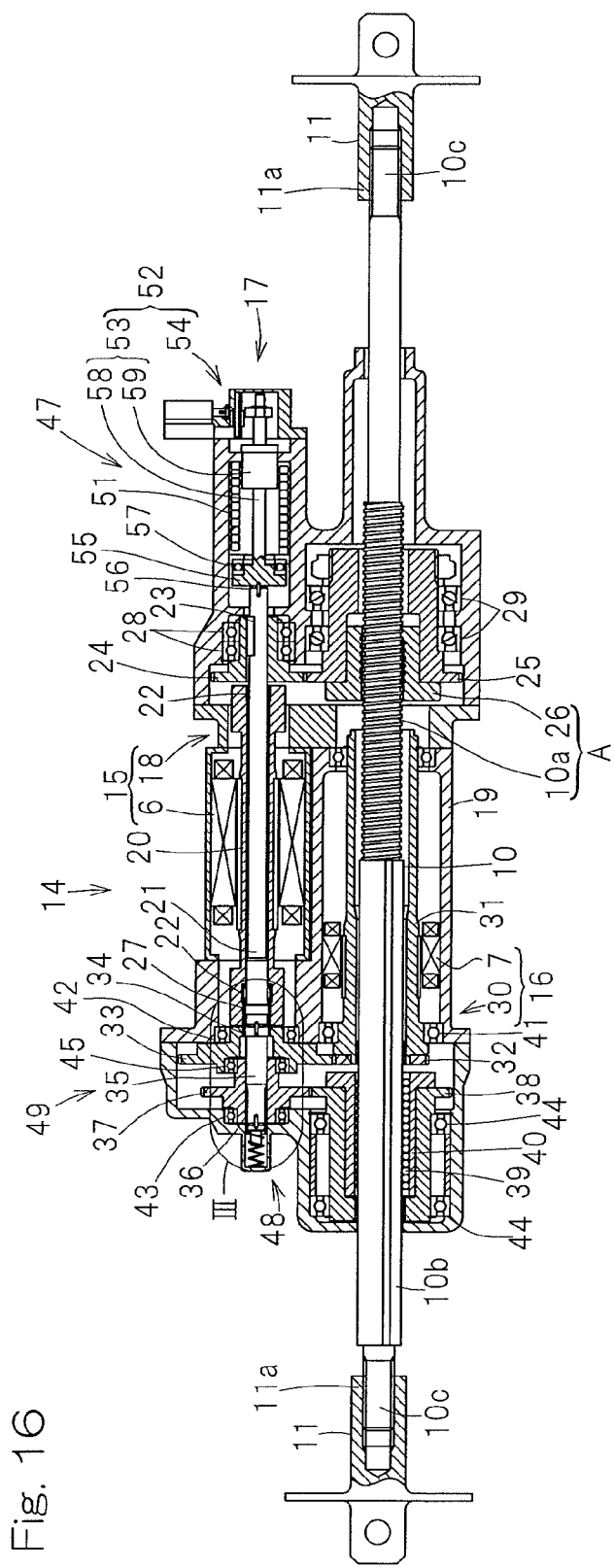
FIG. 16 is a horizontal sectional view showing the steering axle drive unit during a normal operation thereof, which unit is employed in the steer-by-wire steering system designed in accordance with a second preferred embodiment of the present invention.

Although the first preferred embodiment hereinabove described has been shown and described as having the nut portion 11a of each of the tie rods 11 supported by the tubular housing portion 19b by means of the stationary slide bearing 80 and the movable slide bearing 81, the nut portion 11a of each of the tie rods 11 may be supported by nothing and be left in a free condition and this is shown in a second preferred embodiment of the present invention shown in FIG. 16.

Any one of the first and second embodiments hereinbefore fully described includes the following modes 1 to 21, in which the use of the hollow motor is not essential.

[Mode 1]

The steer-by-wire steering system according to the mode 1 is a steer-by-wire steering system including a steering axle for steering a vehicle wheel by means of an axial movement and also for changing the toe angle of the vehicle wheel by means of a rotational movement, a steering wheel mechanically isolated from the steering axle, a steering angle sensor for detecting a steering angle of the steering wheel, a steering power transmitting mechanism for axially moving the steering axle by means of a rotation of a steering motor, a toe angle adjusting power transmitting mechanism for rotating the steering axle by means of a rotation of a toe angle adjusting motor, and a steering control section for generating a command signal of the wheel-turning angle and a command signal of the toe angle on the basis of the steering angle detected by the steering angle sensor and applying those command signals to the steering motor and the toe angle adjusting motor, in which the use is made of a switching mechanism, which is operable in the event of failure of the steering motor to disconnect the steering motor from the steering power transmitting mechanism and to transmit the rotation of the toe angle adjusting motor in place of the steering motor to the steering power transmitting mechanism, while restraining the steering axle from rotating, to thereby enable the vehicle wheel to turn and, also, operable in the event of failure of the toe angle adjusting motor to disable the steering axle from rotating and to enable only a vehicle wheel turning by the steering motor, in which the switching mechanism is provided with a linear motion actuator for axially movably arranging a steering intermediate shaft, provided in the steering power transmitting mechanism, for transmitting the rotation of the steering motor, and a toe angle adjusting intermediate shaft, provided in the toe angle adjusting power transmitting mechanism, for transmitting the rotation of the toe angle adjusting motor, in a fashion coaxial with each other and also for axially moving those intermediate shafts together, and in which the switching mechanism includes the transmission coupling and decoupling mechanism operable in the event of failure of the steering motor to cause the linear motion actuator to axially move both of the intermediate shafts so as to perform a series of such operations that after the toe angle adjusting intermediate shaft has been disengaged from the toe angle adjusting motor, the steering intermediate shaft is disengaged from the steering motor to connect it with the toe angle adjusting motor so as to enable the steering to be performed by the toe angle adjusting motor and the rotation of the toe angle adjusting power transmitting mechanism is fixed.

According to the above described construction, by the switching mechanism, in the event of failure of the steering motor, the steering motor is disconnected from the steering power transmitting mechanism and, while the rotation of the steering axle is refrained, the rotation of the toe angle adjusting motor in place of the steering motor is transmitted to the steering power transmitting mechanism to enable the wheel turning, thus providing a failsafe functionality by which wheel turning can be effected even in the event of failure of the steering motor. Also, by the switching mechanism, in the event of failure of the toe angle adjusting motor, the rotation of the steering axle is halted so as to enable the steering motor to solely perform the wheel turning, and, accordingly, a safe driving can be accomplished with the toe angle adjusting mechanism frozen in the event of failure of the toe angle adjusting motor. A series of operations to switch the power transmission system between the steering power transmitting mechanism and the toe angle adjusting power transmitting mechanism in the event of failure of the steering motor and of the toe angle adjusting motor are carried out by the transmission coupling and decoupling mechanism by axially moving the steering intermediate shaft and the toe angle adjusting intermediate shaft by means of the linear motion actuator. In particular, when the steering intermediate shaft and the toe angle adjusting intermediate shaft are coaxially and axially movably arranged relative to each other and those two intermediate shafts are driven by the linear motion actuator so as to move together in the axial direction, the switching mechanism can be assembled compact since the series of operations referred to above is carried out by the transmission coupling and decoupling mechanism.

[Mode 2]

In the mode 1 described above, the switching mechanism may be so configured that by causing the linear motion actuator to move both of the intermediate shafts in the axial direction, in the course of disengaging the steering intermediate shaft from the steering motor and then connecting the steering intermediate shaft with the toe angle adjusting motor after the toe angle adjusting intermediate shaft has been disengaged from the toe angle adjusting motor, a condition occurs in which, without the steering intermediate shaft being disengaged from the steering motor, only the toe angle adjusting intermediate shaft is disengaged from the toe angle adjusting motor and, when in the event of failure of the toe angle adjusting motor the amount of movement of the linear motion actuator is adjusted, the toe angle adjusting motor and the toe angle adjusting power transmitting mechanism can be disengaged from each other without the steering motor and the steering power transmitting mechanism being disengaged from each other.

[Mode 3]

In the mode 1 described above, both of the intermediate shafts are switched in position by the linear motion actuator to one of the reference position and the position in the axial direction at the time of failure of the steering motor;

in which the switching mechanism includes a steering rotatable member, which is positioned on an outer periphery of the steering intermediate shaft and is adapted to be rotated by the steering motor, and a toe angle adjusting drive member, positioned on an outer periphery of the toe angle adjusting intermediate shaft and adapted to be rotated by the toe angle adjusting motor, and a toe angle adjusting driven member positioned on an outer periphery of the toe angle adjusting intermediate shaft for transmitting the rotation of the toe angle adjusting intermediate shaft towards a downstream side;

in which the transmission coupling and decoupling mechanism comprises;

a first transmission coupling and decoupling mechanism operable to connect the steering intermediate shaft with the steering rotatable member when both of the intermediate shafts are held at the reference position, but to disconnect the steering intermediate shaft from the steering rotatable member and, on the other hand, to connect the steering intermediate shaft with the toe angle adjusting drive member when held at the position at the time of failure of the steering motor, a second transmission coupling and decoupling member operable to connect the toe angle adjusting intermediate shaft with the toe angle adjusting drive member when both of the intermediate shafts are held at the reference position, but to disconnect the connection between the toe angle adjusting intermediate shaft and the toe angle adjusting drive member when held at the position at the time of failure of the steering motor, and a third transmission coupling and decoupling mechanism operable to connect the toe angle adjusting intermediate shaft with the toe angle adjusting driven member and also to render the toe angle adjusting intermediate shaft in a non-connected relation with a housing for supporting the steering axle when both of the intermediate shafts are held at the reference position, but to connect the toe angle adjusting intermediate shaft with the housing when held at the position at the time of failure of the steering motor.

[Mode 4]

In the mode 3 described above, more specifically, both of the intermediate shafts may be switched in position by the linear motion actuator to one of the reference position, the position at the time of failure of the steering motor and a position at the time of failure of the toe angle adjusting motor, which is a position intermediate between the reference position and the position at the time of failure of the steering motor; and, when both of the intermediate shafts are held at the position at the time of failure of the steering motor, the first transmission coupling and decoupling mechanism is in position not to disconnect the connection with the steering rotatable member, the second transmission coupling and decoupling mechanism is in position to disconnect the connection with the toe angle adjusting drive member, and the third transmission coupling and decoupling mechanism is in position to connect it with the housing.

[Mode 5]

In the mode 3 described above, the steering motor may be employed in the form of the hollow motor having a hollow motor shaft, the hollow motor shaft being used as the steering rotatable member, the steering intermediate shaft being inserted through the hollow motor shaft.

[Mode 6]

In the mode 1 described above, the linear motion actuator may comprise a spring member for biasing both of the intermediate shafts in the axial direction, and a spring coupling and decoupling mechanism capable of switching the spring member to one of a non-biasing condition, in which the spring member is retained in a compressed condition to disable the biasing to the intermediate shafts, and a biasing condition in which retention of the compressed condition is released to enable the biasing by the spring member.

[Mode 7]

In the mode 6 described above, the spring coupling and decoupling mechanism may comprise an obstructing element arranged within a linear motion range of the spring member or within a motion range of a member capable of undergoing a linear motion together with the spring member for obstructing the linear motion, and an obstructing element removing mechanism for removing the obstructing element to release the spring member from the compressed condition.

[Mode 8]

In the mode 7 described above, the obstructing element removing mechanism is of a type capable of removing, by means of the linear motion actuator, the obstructing element protruding within the linear motion range of the spring member or within the motion range of the member capable of undergoing the linear motion together with the spring member.

[Mode 9]

In the mode 6 described above, the spring coupling and decoupling mechanism may comprise a linear to rotary motion translating mechanism for translating the linear motion of the spring member into a rotary motion, and a rotation regulating mechanism for regulating the rotation of the linear to rotary motion translating mechanism.

[Mode 10]

In the mode 9 described above, the linear to rotary motion translating mechanism may be a ball screw.

[Mode 11]

In the mode 9 described above, the rotation regulating mechanism may comprise a projecting piece provided in a rotary shaft, a lever playing a role of halting the rotation by engaging with the projecting piece, and a linear motion actuator for activating the lever.

[Mode 12]

In the mode 1 described above, a thrust bearing is preferably interposed between respective end faces of the steering intermediate shaft and the toe angle adjusting intermediate shaft.

[Mode 13]

In the mode 3 described above, where the transmission coupling and decoupling mechanism comprised of the first to third transmission coupling and decoupling mechanism is provided, in the transmission coupling and decoupling mechanism, coupling and decoupling a power transmission between the steering motion transmitting mechanism and the toe angle adjusting power transmission mechanism and both of the intermediate shafts are accomplished by means of splines of internal teeth and splines of external teeth, which are capable of being meshed with each other.

[Mode 14]

In the mode 13 described above, the steering rotatable member, the toe angle adjusting drive member and spline forming portions of the housing may be arranged in a direction conforming to the direction of arrangement of the steering intermediate shaft and the toe angle adjusting intermediate shaft;

the first transmission coupling and decoupling mechanism comprises splines of internal teeth formed in an inner periphery of the steering rotatable member, splines of internal teeth formed in an inner periphery of the toe angle adjusting drive member, and splines of external teeth provided in an outer periphery of the steering intermediate shaft and capable of engaging the splines of the internal teeth of the steering rotatable member, when the steering intermediate shaft is held at the reference position, but capable of disengaging from the splines of the internal teeth of the steering rotatable member and engaging the splines of the internal teeth of the toe angle adjusting drive member when the steering intermediate shaft is held at the position at the time of failure of the steering motor;

the second transmission coupling and decoupling mechanism comprises the splines of the internal teeth of the toe angle adjusting drive member and the splines of the external teeth provided in the outer periphery of the toe angle adjusting intermediate shaft and capable of engaging the splines of the internal teeth of the toe angle adjusting drive member when at the reference position, but disengaging from the splines of the internal teeth of the toe angle adjusting drive member when held at the position at the time of failure of the steering motor; and the third transmission coupling and decoupling mechanism comprises splines of internal teeth provided in an inner periphery of a toe angle adjusting driven member, splines of internal teeth provided in the housing and splines of external teeth provided in an outer periphery of the toe angle adjusting intermediate shaft and capable of engaging the splines of the internal teeth of the toe angle adjusting driven member when at the reference position, but capable of engaging both of the splines of the internal teeth of the toe angle adjusting driven member and the splines of the internal teeth of the housing when held at the position at the time of failure of the steering motor.

[Mode 15]

In the mode 13 described above, the shape of an axial tip end on a coupling and decoupling side of spline teeth forming the splines may be a tapering shape in which the angle delimited between opposite side faces represents an acute angle.

[Mode 16]

In the mode 14 described above, the shape of an axial tip end on a coupling and decoupling side of spline teeth forming the splines may be a tapering shape in which the angle delimited between opposite side faces represents an acute angle.

[Mode 17]

In the mode 13 described above, the sectional shape of spline teeth forming the splines may represent a trapezoidal shape except for an axial tip end on a coupling and decoupling side thereof, in which case the sectional shape of an axial tip end of the spline teeth on the coupling and decoupling side represents a triangular shape.

[Mode 18]

In the mode 14 described above, the sectional shape of spline teeth forming the splines may represent a trapezoidal shape except for an axial tip end on a coupling and decoupling side thereof, in which case the sectional shape of an axial tip end of the spline teeth on the coupling and decoupling side represents a triangular shape.

[Mode 19]

In the mode 13 described above, the use may be made of a failure handling control section for activating the switching mechanism in response to detection of failure of the steering motor and failure of the toe angle adjusting motor, and a correcting operation control section operable, when the third transmission coupling and decoupling mechanism of the switching mechanism is to be activated in response to the detection of the failure of the steering motor, to cause the toe angle adjusting motor to rotate the toe angle adjusting intermediate shaft an angular distance equal to or larger than one pitch of the neighboring spline teeth of the toe angle adjusting intermediate shaft meshed with the spline teeth of the housing while urging the toe angle adjusting intermediate shaft in the axial direction.

[Mode 20]

In the mode 13 described above, the third transmission coupling and decoupling mechanism is preferably so designed as to result in fixture of the rotation of the toe angle adjusting intermediate shaft prior to disconnection the toe angle adjusting intermediate shaft from the toe angle adjusting motor in the course of the axial movement of both of the intermediate shafts from the reference position towards the position at the time of failure of the steering motor.

[Mode 21]

In the mode 13 described above, a tip end of the steering intermediate shaft on a side confronting the toe angle adjusting intermediate shaft is preferably provided with a projection formed by protruding that tip end towards an axial end side beyond the spline teeth of the steering intermediate shaft engageable with the spline teeth of the toe angle adjusting drive member at the time of failure of the steering motor, the projection having an outer diameter equal to or smaller than a teeth bottom radius of the spline teeth of the steering intermediate shaft.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

[Reference Numerals]

1 . . . Steering wheel
2 . . . Steering angle sensor
5a . . . Steering control section
5b . . . Failure handling control section
5c . . . Correcting operation control section
6 . . . Steering motor
7 . . . Toe angle adjusting motor
10 . . . Steering axle
10a . . . Ball screw shaft portion
10b . . . Splined axle portion
10c . . . Toe angle adjusting male threaded portion
11 . . . Tie rod
11a . . . Nut portion
17 . . . Switching mechanism
18 . . . Steering power transmitting mechanism
19 . . . Housing
19b . . . Tubular housing portion
20 . . . Hollow motor shaft
20a, 33a, 37a, 75a . . . Spline tooth of internal tooth
21 . . . Steering intermediate shaft
21a, 35a, 35b . . . Spline tooth of external tooth
26 . . . Ball nut
30 . . . Toe angle adjusting power transmitting mechanism
31 . . . Hollow motor shaft
33 . . . First intermediate gear (Toe angle adjusting drive member)
35 . . . Toe angle adjusting intermediate shaft
37 . . . Second intermediate gear (Toe angle adjusting driven member)
40 . . . Spline nut
47 . . . Linear motion actuator
49 . . . Transmission coupling and decoupling mechanism
51 . . . Spring member
52 . . . Spring coupling and decoupling mechanism
53 . . . Linear to rotary motion translating mechanism
54 . . . Rotation regulating mechanism
58 . . . Ball screw shaft
59 . . . Ball nut
60 . . . Projection
61 . . . Lever (Obstructing element)
62 . . . Rotation regulating drive source (Linear motion actuator)
71 . . . First transmission coupling and decoupling mechanism
72 . . . Second transmission coupling and decoupling mechanism
73 . . . Third transmission coupling and decoupling mechanism
76 . . . Projecting portion
80 . . . Stationary slide bearing
81 . . . Movable slide bearing
84 . . . Axial motion range
B . . . Obstructing element removing mechanism
L . . . Distance between end faces
S . . . Length of axial motion range

What is claimed is:

1. A steer-by-wire steering system comprising a steering wheel mechanically isolated from a steering axle, a steering angle sensor for detecting a steering angle of the steering wheel, a steering motor, a steering power transmitting mechanism for transmitting a rotation of the steering motor to the steering axle, a toe angle adjusting motor, a toe angle adjusting power transmitting mechanism for adjusting a toe angle by means of a rotation of the toe angle adjusting motor, and a steering control section for generating a command signal of a wheel-turning angle and a command signal of the toe angle on the basis of the steering angle detected by the steering angle sensor and applying those command signals to the steering motor and the toe angle adjusting motor;

in which there is provided a switching mechanism operable in the event of failure of the steering motor to disconnect the steering motor from the steering power transmitting mechanism and to transmit the rotation of the toe angle adjusting motor in place of the steering motor to the steering power transmitting mechanism, while restraining the toe angle from changing, to enable a vehicle wheel to turn and, also, operable in the event of failure of the toe angle adjusting motor to disable the toe angle adjusting power transmitting mechanism from transmitting a motion and to enable only a vehicle wheel turning by the steering motor; and in which one or both of the steering motor and the toe angle adjusting motor is or are employed in the form of a hollow motor.

2. The steer-by-wire steering system as claimed in claim 1, in which the steering axle is a shaft which, when moved in an axial direction, turns a vehicle wheel, but which, when rotated, changes the toe angle of the vehicle wheel; the steering power transmitting mechanism is operable to axially move the steering axle by means of the rotation of the steering motor; the toe angle adjusting power transmitting mechanism is operable to rotate the steering axle by means of the rotation of the toe angle adjusting motor; and the switching mechanism is operable in the event of failure of the steering motor to disconnect the steering motor from the steering power transmitting mechanism and to transmit the rotation of the toe angle adjusting motor in place of the steering motor to the steering power transmitting mechanism, while restraining the steering axle from rotating, to thereby enable the vehicle wheel to turn and, also, operable in the event of failure of the toe angle adjusting motor to disable the steering axle from rotating and to enable only a vehicle wheel turning by the steering motor.

3. The steer-by-wire steering system as claimed in claim 1, in which the toe angle adjusting motor is employed in the form of the hollow motor and the steering axle is inserted through a hollow motor shaft of the toe angle adjusting motor comprised of the hollow motor.

4. The steer-by-wire steering system as claimed in claim 1, in which the steering motor is employed in the form of the hollow motor and a component part of the switching mechanism is inserted through a hollow motor shaft of the steering motor comprised of the hollow motor.

5. The steer-by-wire steering system as claimed in claim 1, in which a portion of the steering axle is provided with a ball screw shaft portion and further comprising a ball nut threadingly engaged with the ball screw shaft portion for rotation only and in which the steering power transmitting mechanism is operable to axially move the steering axle by rotating the ball nut by means of the rotation of the steering motor, to thereby perform the wheel turning.

6. The steer-by-wire steering system as claimed in claim 1, in which the steering axle is rotatably provided with a spline shaft portion and further comprising a spline nut engageable with the spline shaft portion for axial relative movement and in which the toe angle adjusting power transmitting mechanism is operable to rotate the spline nut by means of the toe angle adjusting motor to rotate the steering axle while permitting the axial movement of the steering axle, to thereby change the length of projection of a tie rod, engaged with a toe angle adjusting male threaded portion at one end of the steering axle, from the steering axle so as to change the toe angle.

7. The steer-by-wire steering system as claimed in claim 6, in which spline teeth of the spline shaft portion of the steering axle and spline teeth of the spline nut are held in sliding contact or rolling contact with each other.

8. The steer-by-wire steering system as claimed in claim 6, in which a pair of toe angle adjusting male threaded portions provided in opposite ends of the steering angle have respective helices opposite to each other such that when the spline nut is rotated in a predetermined certain direction, the left and right tie rods are caused to protrude, but when rotated in the reverse direction, the left and right tie rods are retracted.

9. The steer-by-wire steering system as claimed in claim 6, further comprising a housing for accommodating the steering power transmitting mechanism and having the steering axle extending therethrough, the housing being provided with a tubular housing portion that is situated on an outer peripheral side of the nut portion of each of the tie rods threadingly engaged with the respective toe angle adjusting male threaded portion of the steering axle, the tubular housing portion being projected from an inner end of the nut portion in a direction axially outwardly thereof, and in which a sectional outer peripheral surface of a part or the whole of an outer periphery of the housing portion, lying perpendicular to a longitudinal axis of the nut portion, is of a shape different from a circle about the longitudinal axis, and further comprising a stationary slide bearing having an inner peripheral shape matching with the outer peripheral shape of the nut portion, the stationary slide bearing being provided as fixed to an inner periphery of the tubular housing portion, the nut portion being supported by the stationary slide bearing for sliding movement in the axial direction, but non-rotation.

10. The steer-by-wire steering system as claimed in claim 9, further comprising an annular movable slide bearing slidable along an inner peripheral surface of the tubular housing portion, the movable slide bearing being provided as fixed to an axial portion of the outer peripheral surface of the nut portion of each of the tie rods.

11. The steer-by-wire steering system as claimed in claim 10, in which the distance between respective mutually confronting end faces of the stationary and movable slide bearings, when the steering axle is held at an intermediate position, which is a position within an axial motion range of the steering axle, at which an automotive vehicle is in position to travel straight forwards, is equal to or greater than the length of the axial motion range.

12. The steer-by-wire steering system as claimed in claim 1, in which the toe angle adjusting motor is of a type in which the maximum generated torque is smaller than the maximum generated torque of the steering motor.

13. The steer-by-wire steering system as claimed in claim 1, in which the steering axle is operable to turn the vehicle wheel upon axial movement thereof and to change the toe angle of the vehicle wheel as a result of the rotation thereof;
in which the switching mechanism is provided with a linear motion actuator for axially movably arranging a steering intermediate shaft, provided in the steering power transmitting mechanism, for transmitting the rotation of the steering motor, and a toe angle adjusting intermediate shaft, provided in the toe angle adjusting power transmitting mechanism, for transmitting the rotation of the toe angle adjusting motor, in a fashion coaxial with each other and also for axially moving those intermediate shafts together, and
in which the switching mechanism includes the transmission coupling and decoupling mechanism operable in the event of failure of the steering motor to cause the linear motion actuator to axially move both of the intermediate shafts so as to perform a series of such operations that after the toe angle adjusting intermediate shaft has been disengaged from the toe angle adjusting motor, the steering intermediate shaft is disengaged from the steering motor to connect it with the toe angle adjusting motor so as to enable the steering to be performed by the toe angle adjusting motor and the rotation of the toe angle adjusting power transmitting mechanism is fixed.

14. The steer-by-wire steering system as claimed in claim 13, in which the switching mechanism is so configured that by causing the linear motion actuator to move both of the intermediate shafts in the axial direction, in the course of disengaging the steering intermediate shaft from the steering motor and then connecting the steering intermediate shaft with the toe angle adjusting motor after the toe angle adjusting intermediate shaft has been disengaged from the toe angle adjusting motor, a condition occurs in which, without the steering intermediate shaft being disengaged from the steering motor, only the toe angle adjusting intermediate shaft is disengaged from the toe angle adjusting motor and, when in the event of failure of the toe angle adjusting motor the amount of movement of the linear motion actuator is adjusted, the toe angle adjusting motor and the toe angle adjusting power transmitting mechanism can be disengaged from each other without the steering motor and the steering power transmitting mechanism being disengaged from each other.

15. The steer-by-wire steering system as claimed in claim 13, in which both of the intermediate shafts are switched in position by the linear motion actuator to one of the reference position and the position in the axial direction at the time of failure of the steering motor;

in which the switching mechanism includes a steering rotatable member, which is positioned on an outer periphery of the steering intermediate shaft and is adapted to be rotated by the steering motor, and a toe angle adjusting drive member, positioned on an outer periphery of the toe angle adjusting intermediate shaft and adapted to be rotated by the toe angle adjusting motor, and a toe angle adjusting driven member positioned on an outer periphery of the toe angle adjusting intermediate shaft for transmitting the rotation of the toe angle adjusting intermediate shaft towards a downstream side;

in which the transmission coupling and decoupling mechanism comprises;

a first transmission coupling and decoupling mechanism operable to connect the steering intermediate shaft with the steering rotatable member when both of the intermediate shafts are held at the reference position, but to disconnect the steering intermediate shaft from the steering rotatable member and, on the other hand, to connect the steering intermediate shaft with the toe angle adjusting drive member when held at the position at the time of failure of the steering motor, a second transmission coupling and decoupling member operable to connect the toe angle adjusting intermediate shaft with the toe angle adjusting drive member when both of the intermediate shafts are held at the reference position, but to disconnect the connection between the toe angle adjusting intermediate shaft and the toe angle adjusting drive member when held at the position at the time of failure of the steering motor, and a third transmission coupling and decoupling mechanism operable to connect the toe angle adjusting intermediate shaft with the toe angle adjusting driven member and also to render the toe angle adjusting intermediate shaft in a non-connected relation with a housing for supporting the steering axle when both of the intermediate shafts are held at the reference position, but to connect the toe angle adjusting intermediate shaft with the housing when held at the position at the time of failure of the steering motor.

16. The steer-by-wire steering system as claimed in claim 15, in which both of the intermediate shafts are switched in position by the linear motion actuator to one of the reference position, the position at the time of failure of the steering motor and a position at the time of failure of the toe angle adjusting motor, which is a position intermediate between the reference position and the position at the time of failure of the steering motor; and, when both of the intermediate shafts are held at the position at the time of failure of the steering motor, the first transmission coupling and decoupling mechanism is in position not to disconnect the connection with the steering rotatable member, the second transmission coupling and decoupling mechanism is in position to disconnect the connection with the toe angle adjusting drive member, and the third transmission coupling and decoupling mechanism is in position to connect it with the housing.

17. The steer-by-wire steering system as claimed in claim 13, in which the steering motor is employed in the form of the hollow motor having a hollow motor shaft, the hollow motor shaft being used as the steering rotatable member, the steering intermediate shaft being inserted through the hollow motor shaft.

18. The steer-by-wire steering system as claimed in claim 13, in which the linear motion actuator comprises a spring member for biasing both of the intermediate shafts in the axial direction, and a spring coupling and decoupling mechanism capable of switching the spring member to one of a non-biasing condition, in which the spring member is retained in a compressed condition to disable the biasing to the intermediate shafts, and a biasing condition in which retention of the compressed condition is released to enable the biasing by the spring member.

19. The steer-by-wire steering system as claimed in claim 18, in which the spring coupling and decoupling mechanism comprises an obstructing element arranged within a linear motion range of the spring member or within a motion range of a member capable of undergoing a linear motion together with the spring member for obstructing the linear motion, and an obstructing element removing mechanism for removing the obstructing element to release the spring member from the compressed condition.

20. The steer-by-wire steering system as claimed in claim 19, in which the obstructing element removing mechanism is of a type capable of removing, by means of the linear motion actuator, the obstructing element protruding within the linear motion range of the spring member or within the motion range of the member capable of undergoing the linear motion together with the spring member.

21. The steer-by-wire steering system as claimed in claim 18, in which the spring coupling and decoupling mechanism comprises a linear to rotary motion translating mechanism for translating the linear motion of the spring member into a rotary motion, and a rotation regulating mechanism for regulating the rotation of the linear to rotary motion translating mechanism.

22. The steer-by-wire steering system as claimed in claim 21, in which the rotation regulating mechanism comprises a projecting piece provided in a rotary shaft, a lever playing a role of halting the rotation by engaging with the projecting piece, and a linear motion actuator for activating the lever.

23. The steer-by-wire steering system as claimed in claim 15, in which in the transmission coupling and decoupling mechanism, coupling and decoupling a power transmission between the steering motion transmitting mechanism and the toe angle adjusting power transmitting mechanism and both of the intermediate shafts are accomplished by means of splines of internal teeth and splines of external teeth, which are capable of being meshed with each other.

24. The steer-by-wire steering system as claimed in claim 23, in which the steering rotatable member, the toe angle adjusting drive member and spline forming portions of the housing are arranged in a direction conforming to the direction of arrangement of the steering intermediate shaft and the toe angle adjusting intermediate shaft;

the first transmission coupling and decoupling mechanism comprises splines of internal teeth formed in an inner periphery of the steering rotatable member, splines of internal teeth formed in an inner periphery of the toe angle adjusting drive member, and splines of external teeth provided in an outer periphery of the steering intermediate shaft and capable of engaging the splines of the internal teeth of the steering rotatable member, when the steering intermediate shaft is held at the reference position, but capable of disengaging from the splines of the internal teeth of the steering rotatable member and engaging the splines of the internal teeth of the toe angle adjusting drive member when the steering intermediate shaft is held at the position at the time of failure of the steering motor;

the second transmission coupling and decoupling mechanism comprises the splines of the internal teeth of the toe angle adjusting drive member and the splines of the external teeth provided in the outer periphery of the toe angle adjusting intermediate shaft and capable of engaging the splines of the internal teeth of the toe angle adjusting drive member when at the reference position, but disengaging from the splines of the internal teeth of the toe angle adjusting drive member when held at the position at the time of failure of the steering motor; and the third transmission coupling and decoupling mechanism comprises splines of internal teeth provided in an inner periphery of a toe angle adjusting driven member, splines of internal teeth provided in the housing and splines of external teeth provided in an outer periphery of the toe angle adjusting intermediate shaft and capable of engaging the splines of the internal teeth of the toe angle adjusting driven member when at the reference position, but capable of engaging both of the splines of the internal teeth of the toe angle adjusting driven member and the splines of the internal teeth of the housing when held at the position at the time of failure of the steering motor.

25. The steer-by-wire steering system as claimed in claim 23, in which the shape of an axial tip end on a coupling and decoupling side of spline teeth forming the splines is a tapering shape in which the angle delimited between opposite side faces represents an acute angle.

26. The steer-by-wire steering system as claimed in claim 23, in which the sectional shape of spline teeth forming the splines represents a trapezoidal shape except for an axial tip end on a coupling and decoupling side thereof, in which case the sectional shape of an axial tip end of the spline teeth on the coupling and decoupling side represents a triangular shape.

27. The steer-by-wire steering system as claimed in claim 23, further comprising a failure handling control section for activating the switching mechanism in response to detection of failure of the steering motor and failure of the toe angle adjusting motor, and a correcting operation control section operable, when the third transmission coupling and decoupling mechanism of the switching mechanism is to be activated in response to the detection of the failure of the steering motor, to cause the toe angle adjusting motor to rotate the toe angle adjusting intermediate shaft an angular distance equal to or larger than one pitch of the neighboring spline teeth of the toe angle adjusting intermediate shaft meshed with the spline teeth of the housing while urging the toe angle adjusting intermediate shaft in the axial direction.

28. The steer-by-wire steering system as claimed in claim 23, in which the third transmission coupling and decoupling mechanism is so designed as to result in fixture of the rotation of the toe angle adjusting intermediate shaft prior to disconnection the toe angle adjusting intermediate shaft from the toe angle adjusting motor in the course of the axial movement of both of the intermediate shafts from the reference position towards the position at the time of failure of the steering motor.

29. The steer-by-wire steering system as claimed in claim 23, in which a tip end of the steering intermediate shaft on a side confronting the toe angle adjusting intermediate shaft is provided with a projection formed by protruding that tip end towards an axial end side beyond the spline teeth of the steering intermediate shaft engageable with the spline teeth of the toe angle adjusting drive member at the time of failure of the steering motor, the projection having an outer diameter equal to or smaller than a teeth bottom radius of the spline teeth of the steering intermediate shaft.

* * * * *